US011979653B2

(12) United States Patent
Imai et al.

(10) Patent No.: US 11,979,653 B2
(45) Date of Patent: May 7, 2024

(54) IMAGING DEVICE AND ELECTRONIC DEVICE INCLUDING AN AUTHENTICATION PROCESSOR

(71) Applicant: Nidec Copal Corporation, Tokyo (JP)

(72) Inventors: Kenzo Imai, Tokyo (JP); Nobuaki Watanabe, Tokyo (JP); Daisuke Kakemizu, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 414 days.

(21) Appl. No.: 17/299,784

(22) PCT Filed: Dec. 6, 2019

(86) PCT No.: PCT/JP2019/047770
§ 371 (c)(1),
(2) Date: Jun. 4, 2021

(87) PCT Pub. No.: WO2020/121957
PCT Pub. Date: Jun. 18, 2020

(65) Prior Publication Data
US 2022/0021791 A1    Jan. 20, 2022

(30) Foreign Application Priority Data
Dec. 10, 2018    (JP) .................... 2018-230812

(51) Int. Cl.
*H04N 23/57* (2023.01)
*G06F 21/31* (2013.01)
(Continued)

(52) U.S. Cl.
CPC ............ *H04N 23/57* (2023.01); *G06F 21/31* (2013.01); *G06F 21/83* (2013.01); *H04N 23/55* (2023.01)

(58) Field of Classification Search
CPC ........ G03B 11/04; G03B 17/02; G03B 17/18; G03B 9/08; G06F 21/31; G06F 21/83;
(Continued)

(56) References Cited

U.S. PATENT DOCUMENTS

2003/0103034 A1    6/2003    Silverbrook et al.
2008/0174883 A1    7/2008    Oya
(Continued)

FOREIGN PATENT DOCUMENTS

CN        1607451 A      4/2005
CN      101226267 A      7/2008
(Continued)

OTHER PUBLICATIONS

Office Action in CN Application No. 201980080620.1, dated Apr. 2, 2022, 12pp.
(Continued)

*Primary Examiner* — Antoinette T Spinks
(74) *Attorney, Agent, or Firm* — HAUPTMAN HAM, LLP

(57) ABSTRACT

An imaging device includes an image sensor, a blade operable to switch between a closed state to at least partially block light incident on the image sensor and an open state to allow light to be incident on the image sensor, a blade driver that drives the blade, a blade controller that controls the blade driver, an authentication processor that performs authentication based on a result of imaging performed by the image sensor, and an operation detector that detects an operation. The blade controller controls the blade driver to place the blade in the open state in response to a predetermined operation detected by the operation detector and to place the blade in the closed state in response to a prede-
(Continued)

termined time passing in the open state of the blade and no success in the authentication performed by the authentication processor.

10 Claims, 19 Drawing Sheets

(51) Int. Cl.
*G06F 21/83* (2013.01)
*H04N 23/55* (2023.01)

(58) Field of Classification Search
CPC ......... H04M 1/00; H04N 23/55; H04N 23/57; H04N 23/60
See application file for complete search history.

(56) References Cited

U.S. PATENT DOCUMENTS

2009/0052886 A1* 2/2009 Watanabe .......... H04N 1/00307
396/486
2010/0157027 A1* 6/2010 MacNaughton ..... H04N 13/341
348/53
2020/0177777 A1* 6/2020 Imai ..................... H04N 23/60
2020/0374432 A1* 11/2020 Cho ...................... G06F 21/31

FOREIGN PATENT DOCUMENTS

| JP | 2000107128 A | 4/2000 |
| JP | 2004184817 A | 7/2004 |
| JP | 2006311358 A | 11/2006 |
| JP | 2007128153 A | 5/2007 |
| JP | 2010161785 A | 7/2010 |
| JP | 2010191130 A | 9/2010 |
| JP | 2014167559 A | 9/2014 |
| JP | 201733271 A | 2/2017 |

OTHER PUBLICATIONS

International Search Report in PCT/JP2019/047770, dated Mar. 10, 2020. 4pp.

* cited by examiner

IMAGING DEVICE AND ELECTRONIC DEVICE INCLUDING AN AUTHENTICATION PROCESSOR

RELATED APPLICATIONS

The present application is National Phase of International Application No. PCT/JP2019/047770, filed Dec. 6, 2019, and claims priority based on Japanese Patent Application No. 2018-230812, filed Dec. 10, 2018.

FIELD

An aspect of the present invention relates to an imaging device such as a camera.

BACKGROUND

Many devices such as smartphones, tablets, and laptop personal computers (PCs) nowadays incorporate an imaging device (camera). Such a device can be hacked by an external party through a network, and may cause its imaging device to be used and secretly photograph the device user. The imaging device may thus include a component to cover the lens. Patent Literature 1 describes a communication camera incorporated in an electronic device with a lens that can be covered with an anti-peeping component. Patent Literature 2 describes an authentication processing device that performs authentication for improving security and protecting privacy. Known authentication methods using an image captured with a camera are also available, including face recognition.

CITATION LIST

Patent Literature

Patent Literature 1: Japanese Unexamined Patent Application Publication No. 2014-167559
Patent Literature 2: Japanese Unexamined Patent Application Publication No. 2010-161785

BRIEF SUMMARY

Technical Problem

The device including the anti-peeping component to prevent secret photography does not allow use of the camera before authentication, and cannot use an image captured with the camera for authentication. The device is thus to use another authentication method.

Solution to Problem

In response to the above issue, one or more aspects of the present invention are directed to the structures described below. The reference numerals or other labels in parentheses herein denote the corresponding components in the figures to facilitate understanding of the aspects of the present invention. However, the components with such reference numerals do not limit the components according to the aspects of the present invention, which should be construed broadly within the scope technically understandable by those skilled in the art.

An imaging device according to a first aspect of the present invention includes an image sensor (111), a blade (80) operable to switch between a closed state to at least partially block light incident on the image sensor and an open state to allow light to be incident on the image sensor, a blade driver (106) that drives the blade, a blade controller (105) that controls the blade driver, an authentication processor (150) that performs authentication based on a result of imaging performed by the image sensor, and an operation detector (133, 132) that detects an operation. The blade controller (105) controls the blade driver to place the blade in the open state in response to a predetermined operation detected by the operation detector and to place the blade in the closed state in response to a predetermined time passing in the open state of the blade and no success in the authentication performed by the authentication processor.

The imaging device with the above structure can perform authentication with the image sensor in the imaging device without any authentication device prepared independently of the imaging device. The blade is automatically placed in the closed state when authentication is unsuccessful. This improves security.

In the above imaging device, the blade controller (105) may control the blade driver to place the blade in the closed state in response to a failure in the authentication performed by the authentication processor in the open state of the blade.

The imaging device with the above structure can immediately enter the closed state in response to an authentication failure. This increases security further.

In the above imaging device, the blade controller may determine, in a locked state with no success in the authentication performed by the authentication processor, whether the blade is in the closed state at predetermined time intervals and controls the blade driver to place the blade in the closed state in response to the blade being in the open state.

The imaging device with the above structure can place the blade that has been in the open state in the locked state back to the closed state after the predetermined time passes. This effectively prevents the blade from remaining open in the locked state.

In the above imaging device, the blade controller may control the blade driver to place the blade in the closed state in a locked state with no success in the authentication performed by the authentication processor.

The imaging device with the above structure allows the blade to remain closed under an external force for opening the blade applied in the locked state. This effectively prevents the blade from being open as unintended by the user.

In the above imaging device, the blade controller may determine whether the blade is in the open state or in the closed state based on a result of detection performed by the image sensor.

The imaging device with the above structure allows determination as to whether the blade is in the open state or in the closed state without any extra member for determining the open or closed state of the blade. Thus, processes may be performed in accordance with the open or closed state of the blade without additional components for any new structure or additional cost and complicated processing.

The above imaging device may further include a position detector that detects a position of the blade. The blade controller may determine whether the blade is in the open state or in the closed state based on a result of detection performed by the position detector.

The imaging device with the above structure allows appropriate determination as to whether the blade is in the open state or in the closed state in dark surroundings.

The above imaging device may further include a base (10) having an opening and supporting the blade in a movable manner, and an urging member (60) that urges the blade in the open state in a direction different from a direction in which the urging member urges the blade in the closed state. The opening may be between the blade and the image sensor in the closed state of the blade.

The imaging device with the above structure maintains the open or closed state of the blade, and thus prevents the blade from being open or closed unexpectedly under an external force.

In the above imaging device, the blade may be movable by the blade driver and by a manual operation.

The imaging device with the above structure allows the blade to be moved manually when the blade cannot be closed after, for example, unauthorized access. This can increase security.

In the above imaging device, the blade may include an operation unit (80c) operable by a user.

The imaging device with the above structure allows the user to easily operate the blade manually.

An electronic device according to another aspect of the present invention includes at least one of a smartphone, a tablet, or a personal computer (PC) incorporating any one of the above imaging devices.

The electronic device susceptible to privacy invasion and leakage of confidential information caused by unauthorized access may have the above structure to effectively increase security.

DETAILED DESCRIPTION

Figure 1:
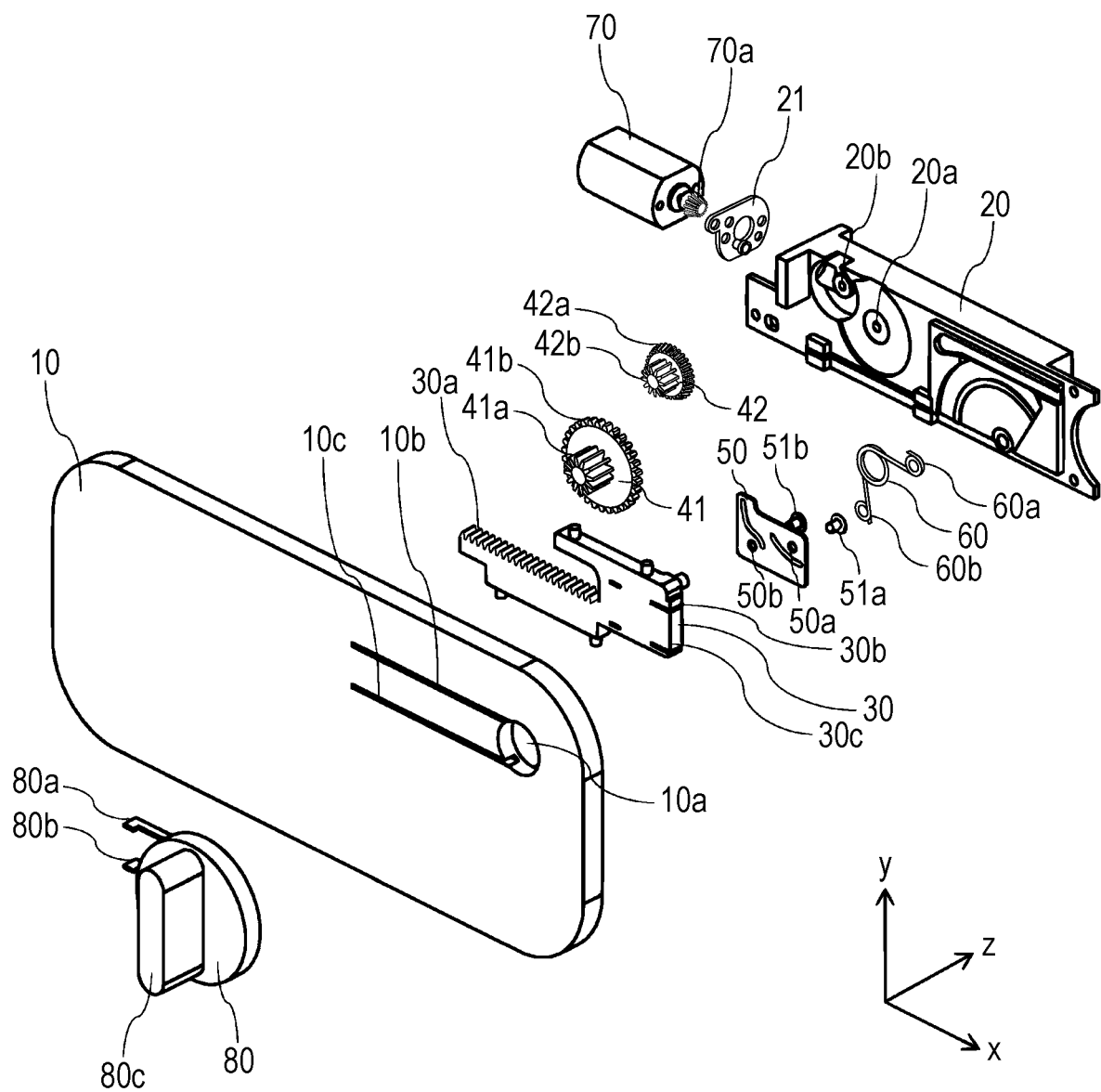
FIG. 1 is an exploded perspective view of a movable blade assembly included in an imaging device according to an embodiment.

An imaging device according to one or more embodiments of the present invention controls a blade for blocking light incident on an image sensor to avoid entering an open state as unintended by the user.

The structures according to one or more embodiments of the present invention will now be described as listed below with reference to the drawings. The embodiments described below are mere examples of the present invention, and should not be construed as limiting the technical scope of the invention. In the figures, the same components are given the same reference numerals, and may not be described.

1. Embodiment
(1) Structure of Movable Blade Assembly in Imaging Device According to Embodiment
(2) Functional Structure of Imaging Device According to Embodiment
(3) Operation of Imaging Device According to Embodiment
(4) First Modification
(5) Second Modification (6) Third Modification
(7) Fourth Modification
2. Features
3. Supplemental Examples

1. Embodiment

(1) Structure of Movable Blade Assembly in Imaging Device According to Embodiment An embodiment of the present invention will now be described specifically with reference to FIGS. 1 to 23. The structure of a movable blade assembly in an imaging device, the functional structure of the imaging device, and the operation of the imaging device will be described in the stated order. In the present embodiment, the state with no success in authentication is referred to as a locked state. The state with a success in authentication is referred to as an unlocked state.

The figures may include x-axis, y-axis, and z-axis that are orthogonal to one another. The arrow directions for x-axis, y-axis, and z-axis in the figures may be referred to as positive directions, and the directions opposite to the arrow directions may be referred to as negative directions. The negative z-direction, in which a subject is to be positioned facing an image sensor, may be referred to as a subject end. The positive z-direction, in which the image sensor is to be positioned facing a subject, may be referred to as an image sensor end.

Figure 2:
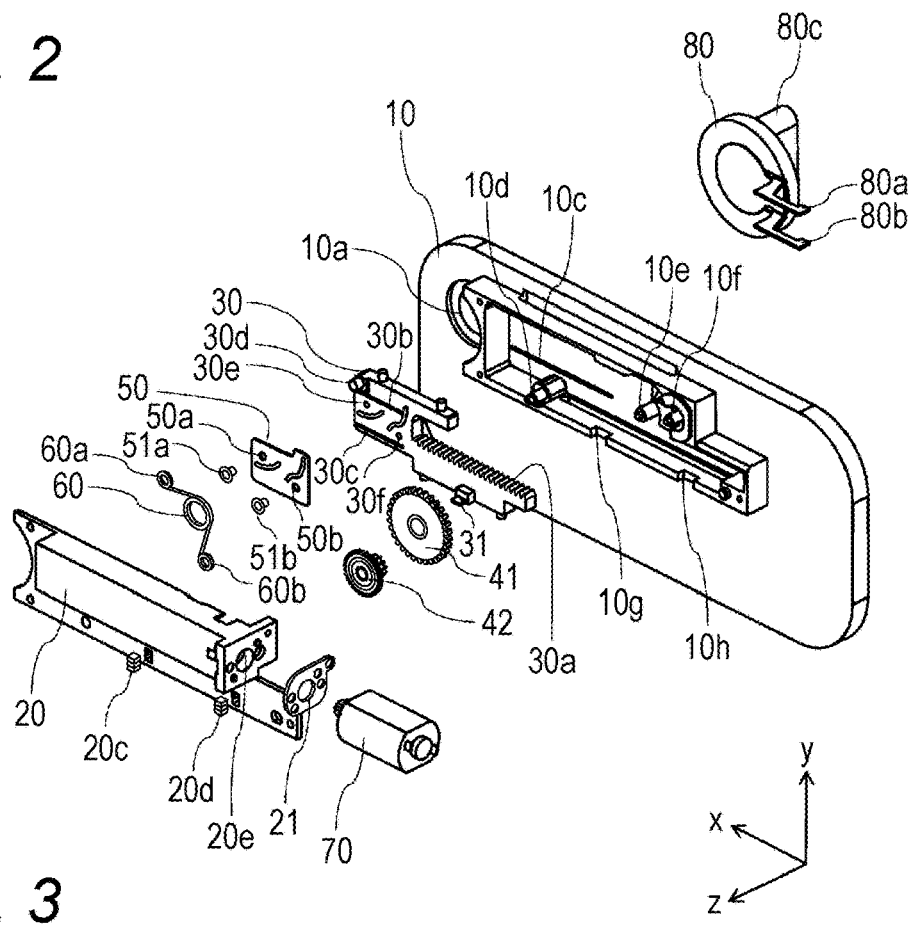
FIG. 2 is an exploded perspective view of the movable blade assembly included in the imaging device according to the embodiment.
Figure 3:
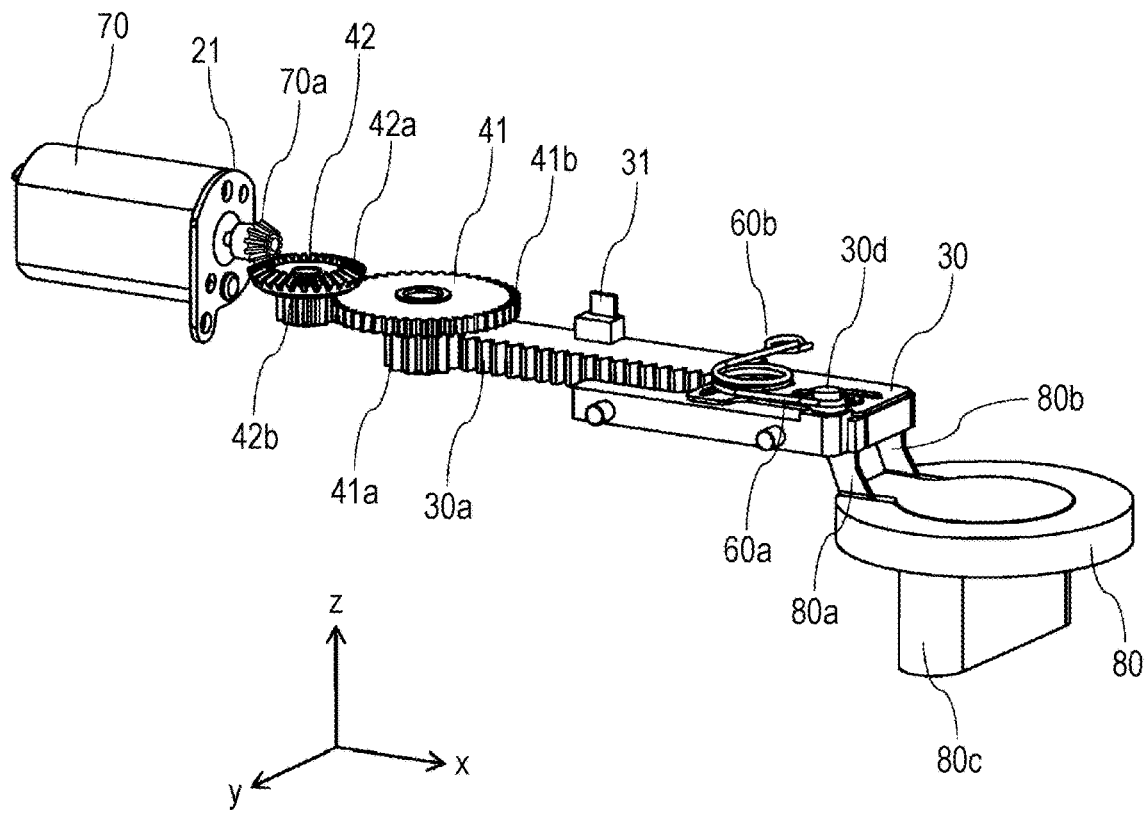
FIG. 3 is a perspective view of a drive assembly included in the imaging device according to the embodiment.
Figure 4:
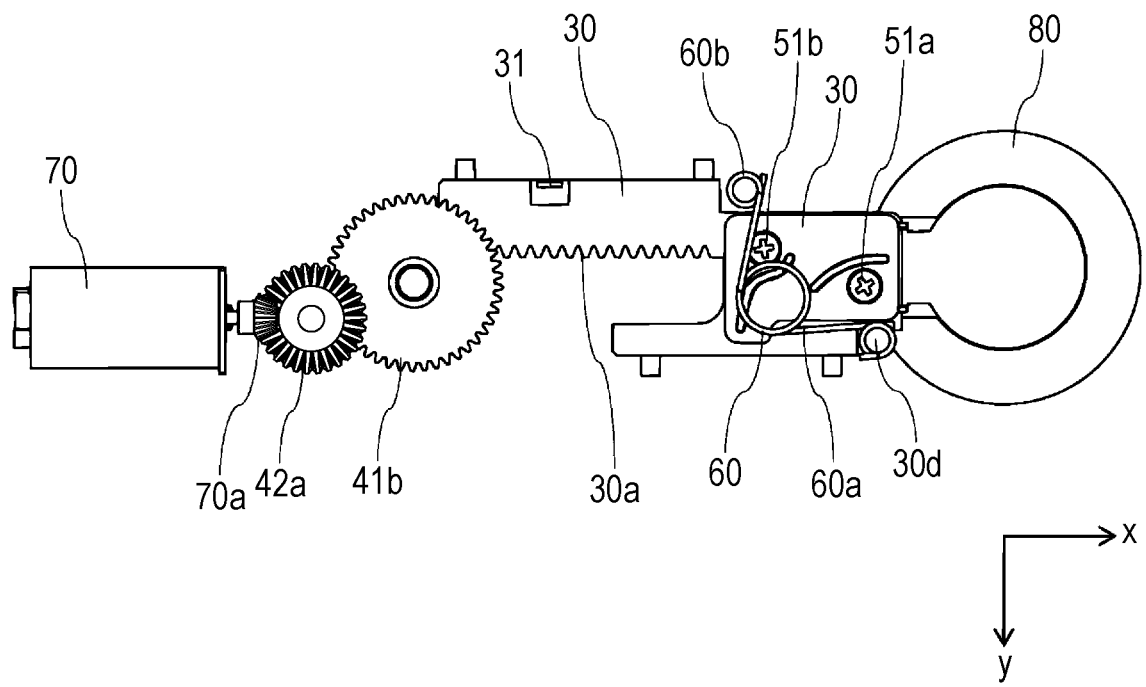
FIG. 4 is a plan view of the drive assembly included in the imaging device according to the embodiment viewed from the positive z-direction.
Figure 5:
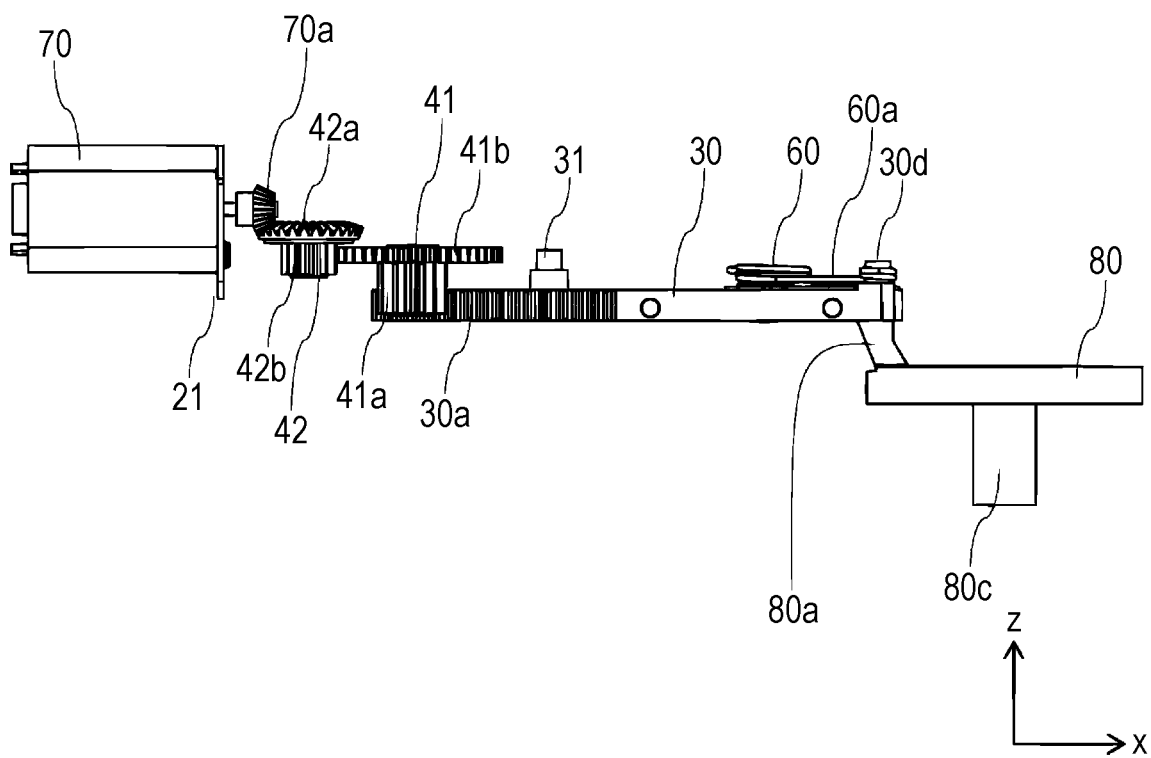
FIG. 5 is a plan view of the drive assembly included in the imaging device according to the embodiment viewed from the positive y-direction.

FIGS. 1 to 21 are schematic diagrams of the imaging device (camera) according to the present embodiment. FIGS. 1 and 2 are exploded perspective views of the movable blade assembly in the imaging device viewed in different directions. FIGS. 3 to 5 are diagrams of a drive assembly including components between a motor 70 and a blade 80 connected together. FIG. 3 is a perspective view, FIG. 4 is a plan view viewed from the positive z-direction, and FIG. 5 is a plan view viewed from the positive y-direction.

FIGS. 6 to 13 are diagrams of the movable blade assembly or the drive assembly with the blade 80 open. FIGS. 14 to 21 are diagrams of the movable blade assembly or the drive assembly with the blade 80 closed. FIGS. 6 to 13 correspond to FIGS. 14 to 21.

Figure 6:
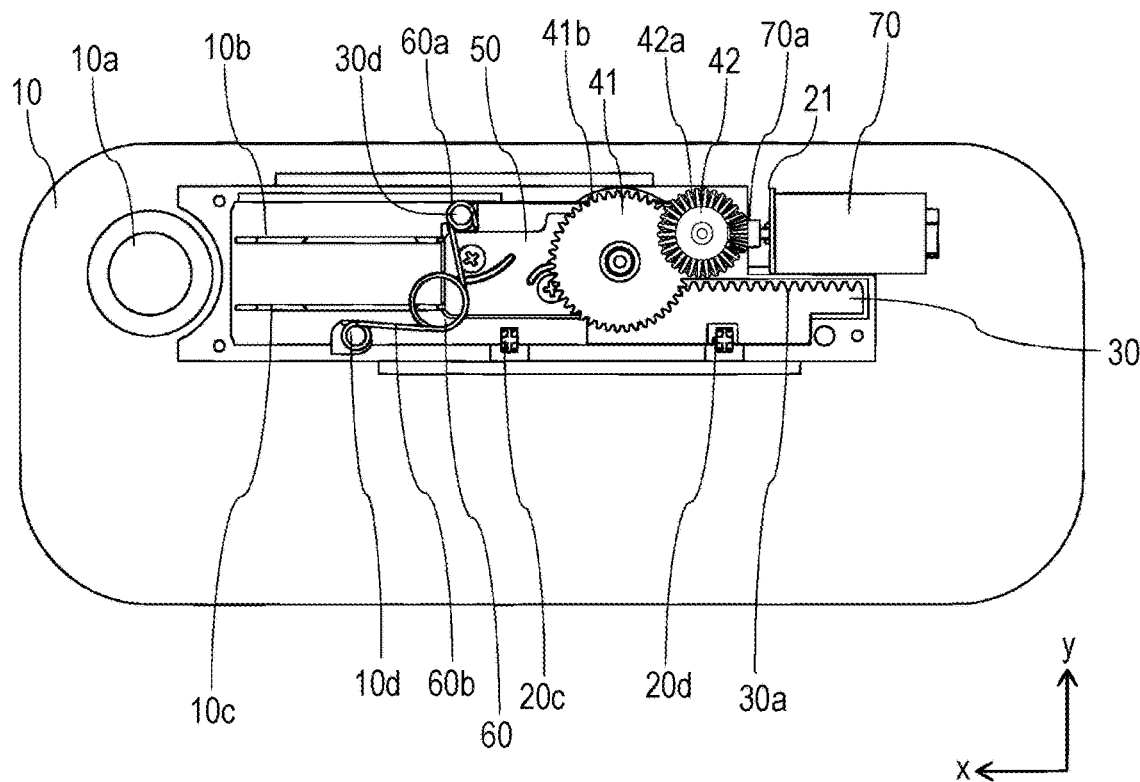
FIG. 6 is a plan view of the movable blade assembly included in the imaging device according to the embodiment viewed from the positive z-direction with a blade open.
Figure 7:
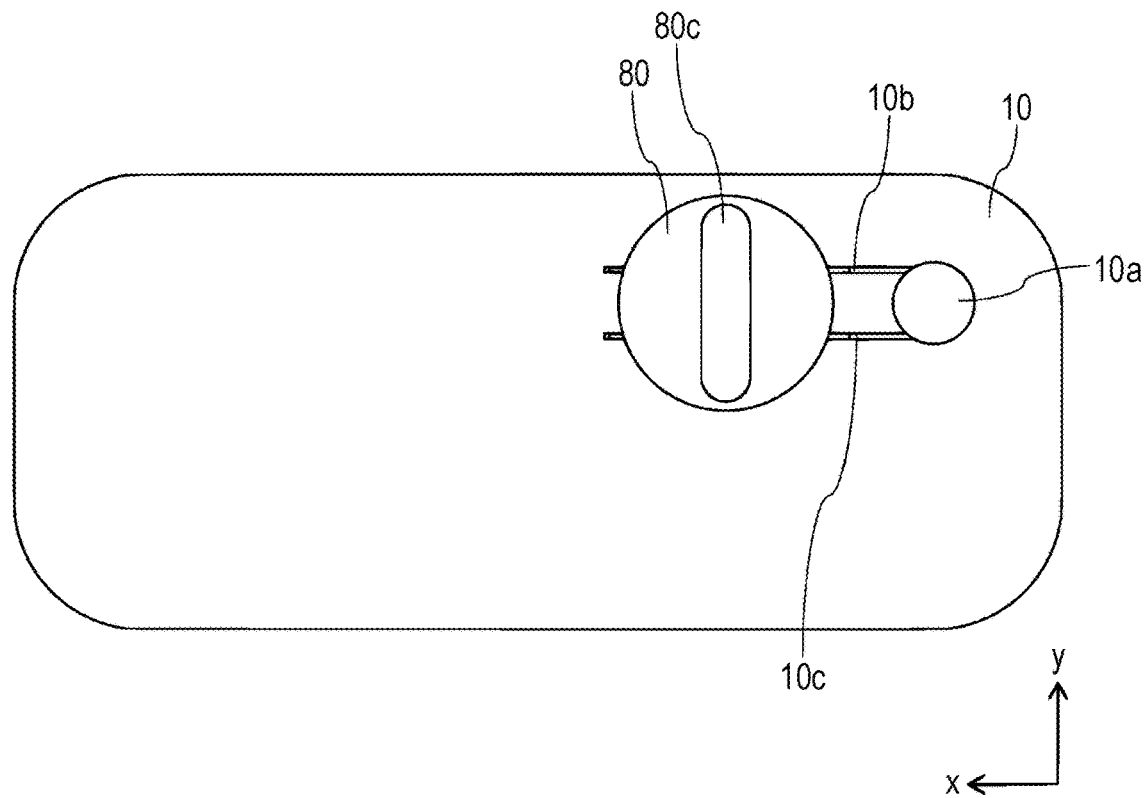
FIG. 7 is a plan view of the movable blade assembly included in the imaging device according to the embodiment viewed from the negative z-direction with the blade open.
Figure 8:
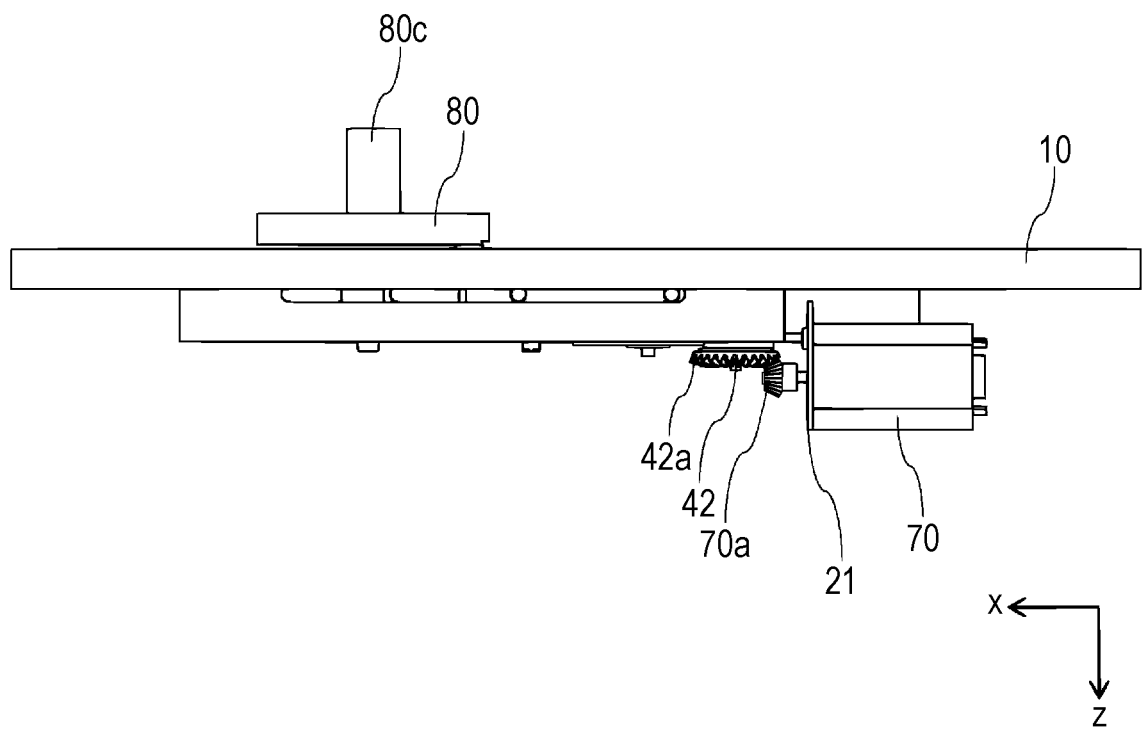
FIG. 8 is a plan view of the movable blade assembly included in the imaging device according to the embodiment viewed from the positive y-direction with the blade open.
Figure 9:
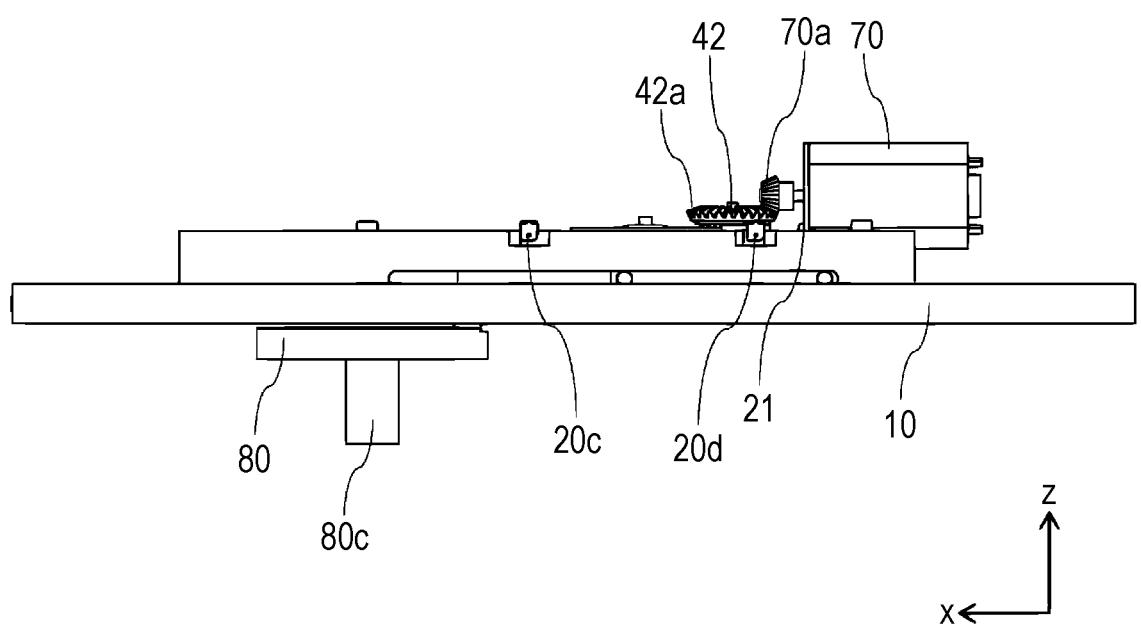
FIG. 9 is a plan view of the movable blade assembly included in the imaging device according to the embodiment viewed from the negative y-direction with the blade open.
Figure 10:
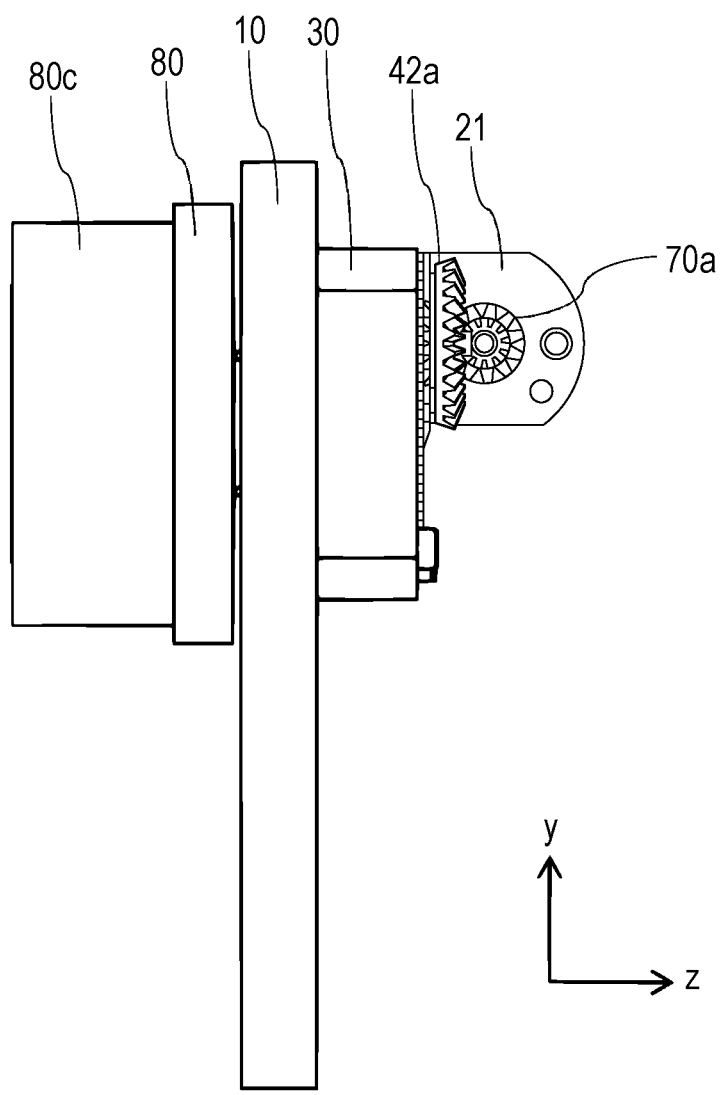
FIG. 10 is a plan view of the movable blade assembly included in the imaging device according to the embodiment viewed from the positive x-direction with the blade open.
Figure 11:
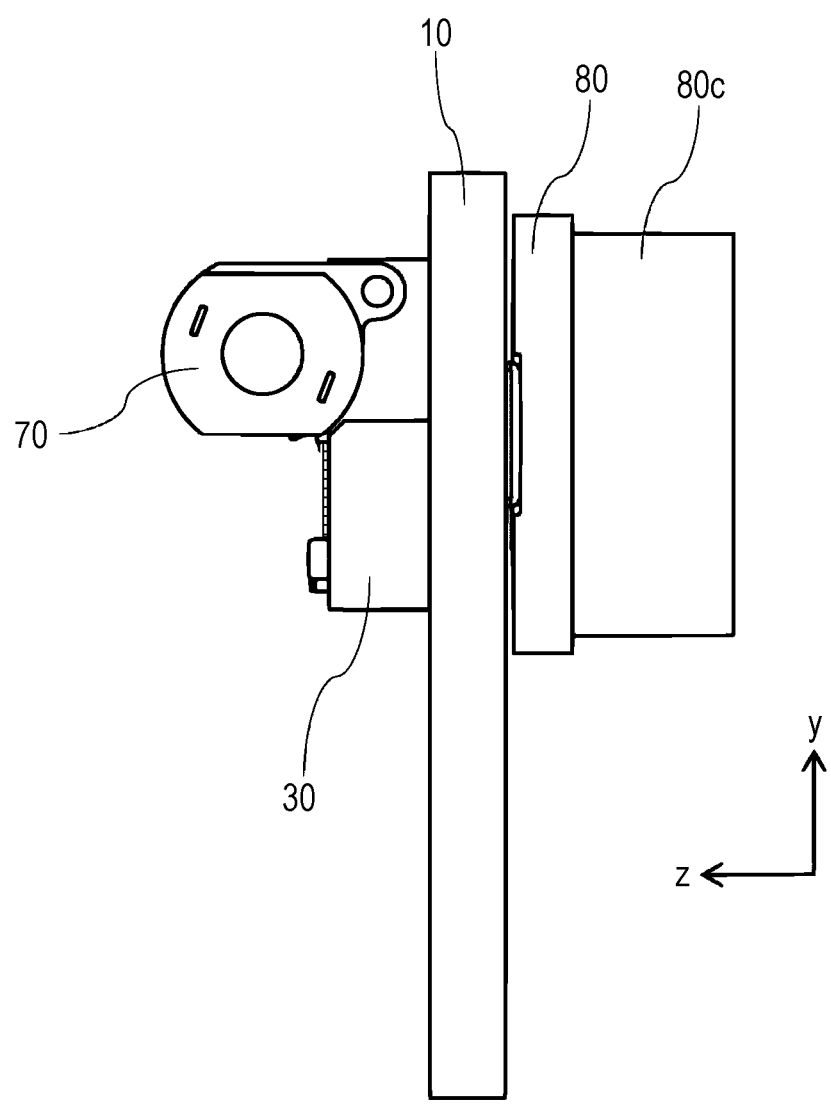
FIG. 11 is a plan view of the movable blade assembly included in the imaging device according to the embodiment viewed from the negative x-direction with the blade open.
Figure 12:
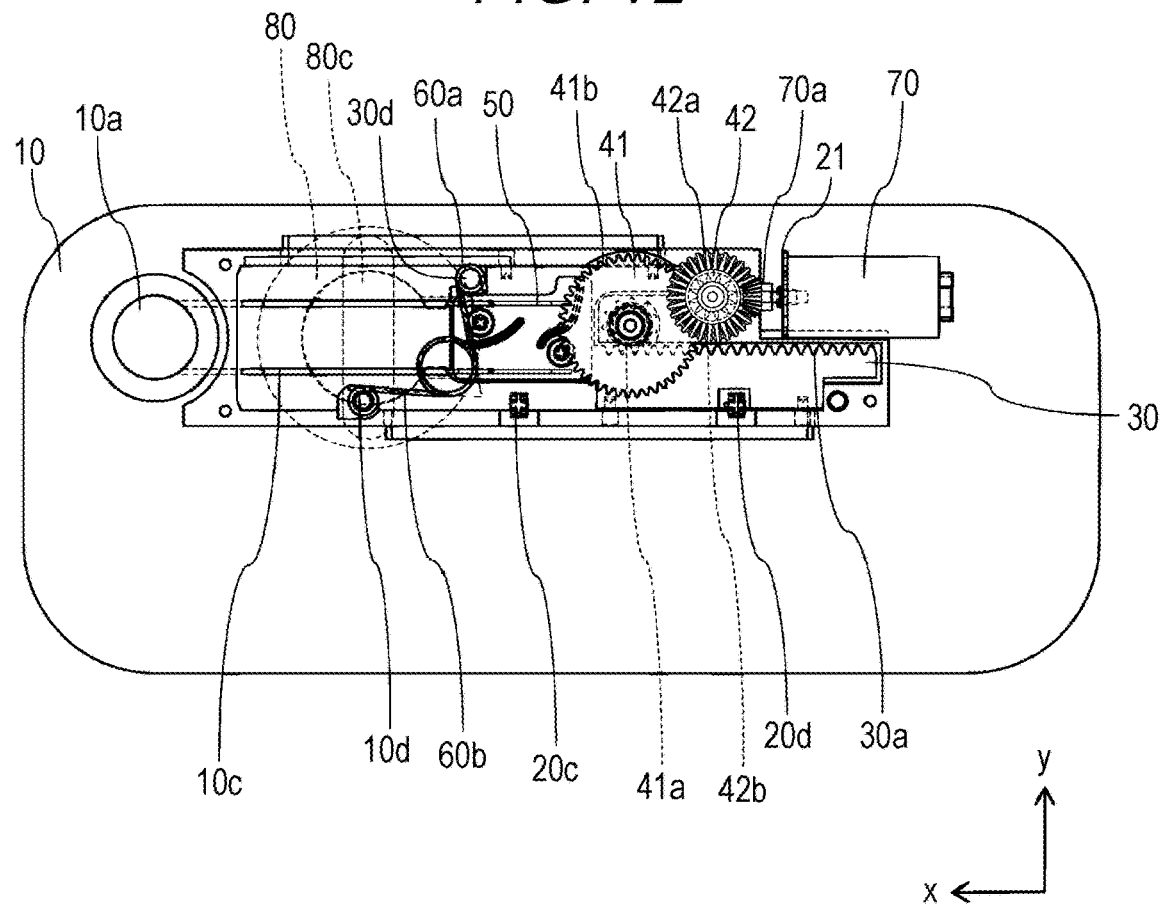
FIG. 12 is a transparent plan view of the movable blade assembly included in the imaging device according to the embodiment viewed from the positive z-direction with the blade open.
Figure 13:
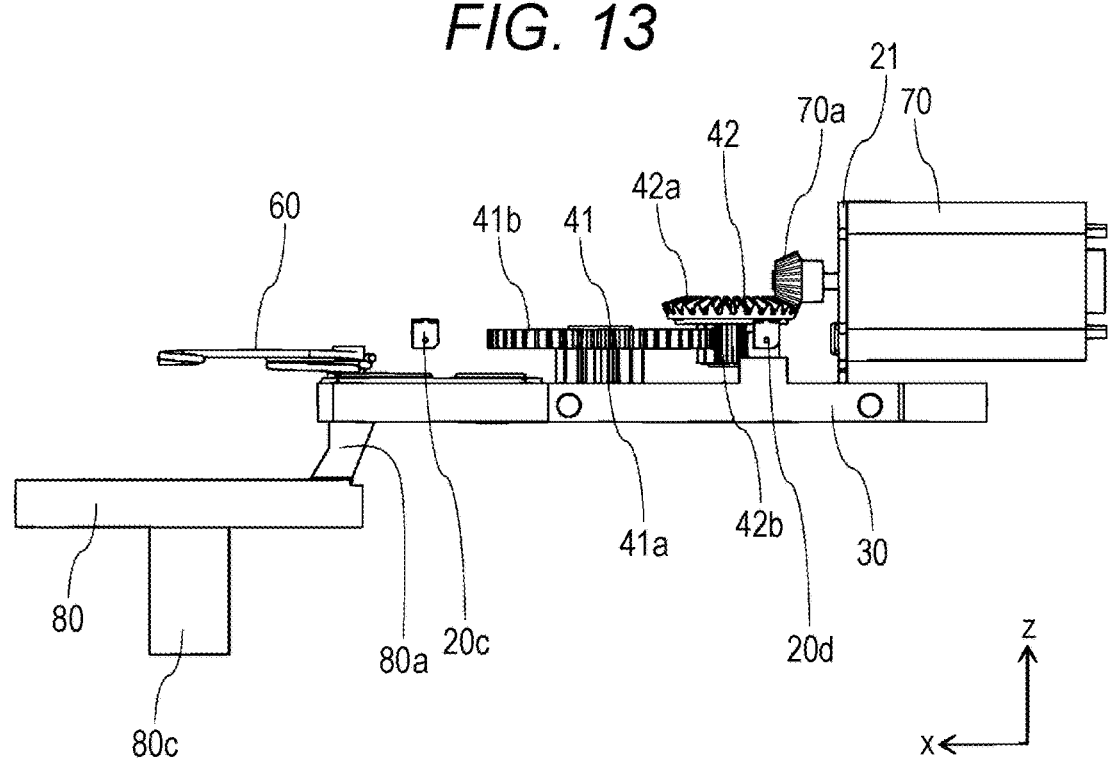
FIG. 13 is a plan view of the drive assembly included in the imaging device according to the embodiment viewed from the positive y-direction with the blade open.

FIG. 6 is a plan view of the movable blade assembly viewed from the positive z-direction. FIG. 7 is a plan view of the movable blade assembly viewed from the negative z-direction. FIG. 8 is a plan view of the movable blade assembly viewed from the positive y-direction. FIG. 9 is a plan view of the movable blade assembly viewed from the negative y-direction. FIG. 10 is a plan view of the movable blade assembly viewed from the positive x-direction. FIG. 11 is a plan view of the movable blade assembly viewed from the negative x-direction. FIG. 12 is a plan view of the movable blade assembly viewed from the positive z-direction. FIG. 13 is a plan view of the drive assembly in the movable blade assembly viewed from the positive y-direction.

Figure 14:
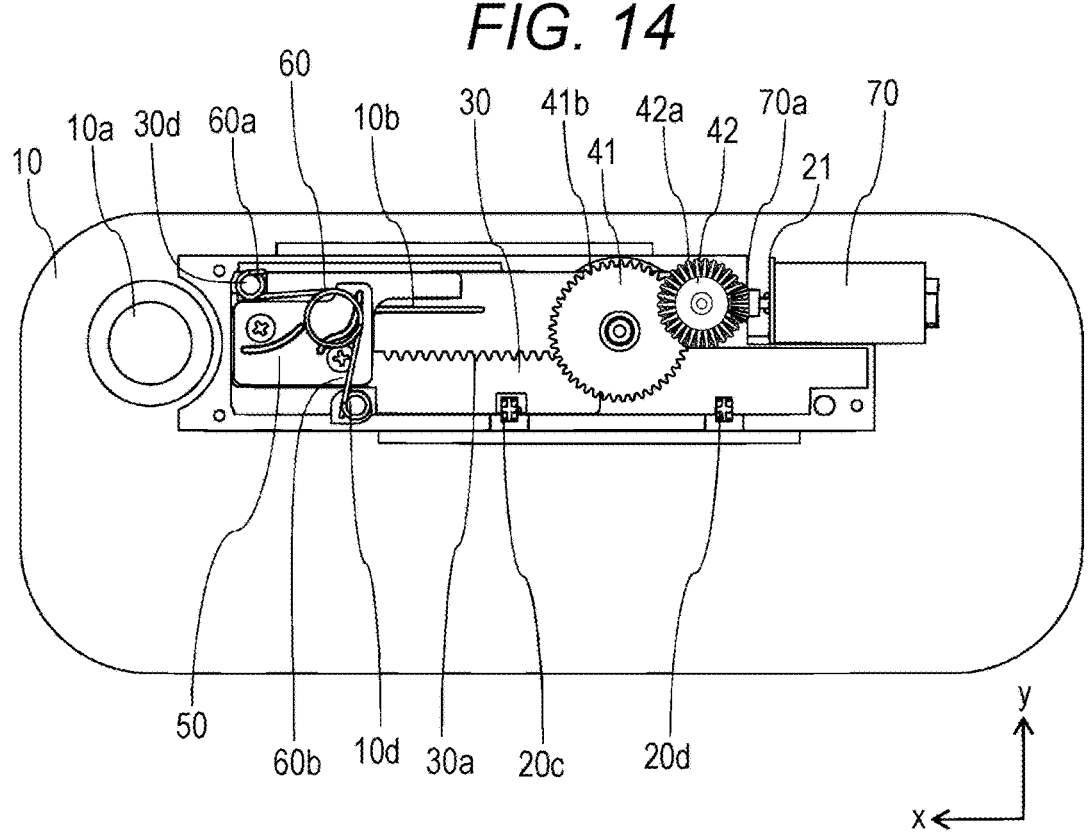
FIG. 14 is a plan view of the movable blade assembly included in the imaging device according to the embodiment viewed from the positive z-direction with the blade closed.
Figure 15:
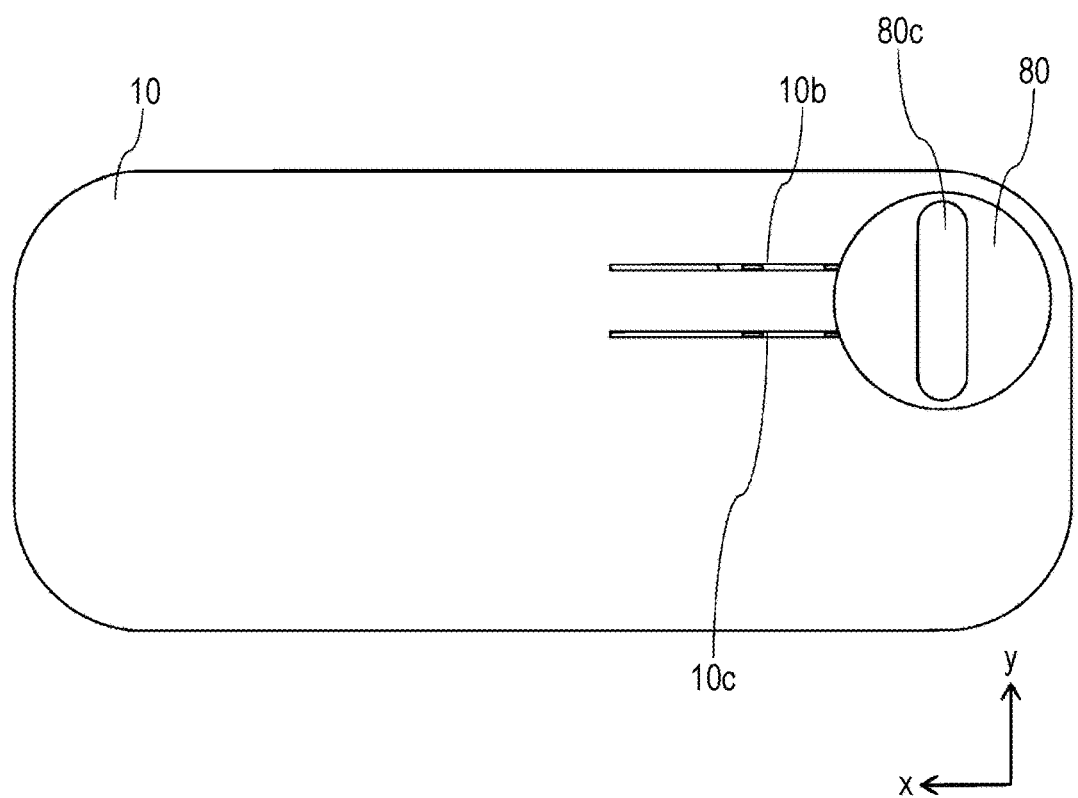
FIG. 15 is a plan view of the movable blade assembly included in the imaging device according to the embodiment viewed from the negative z-direction with the blade closed.
Figure 16:
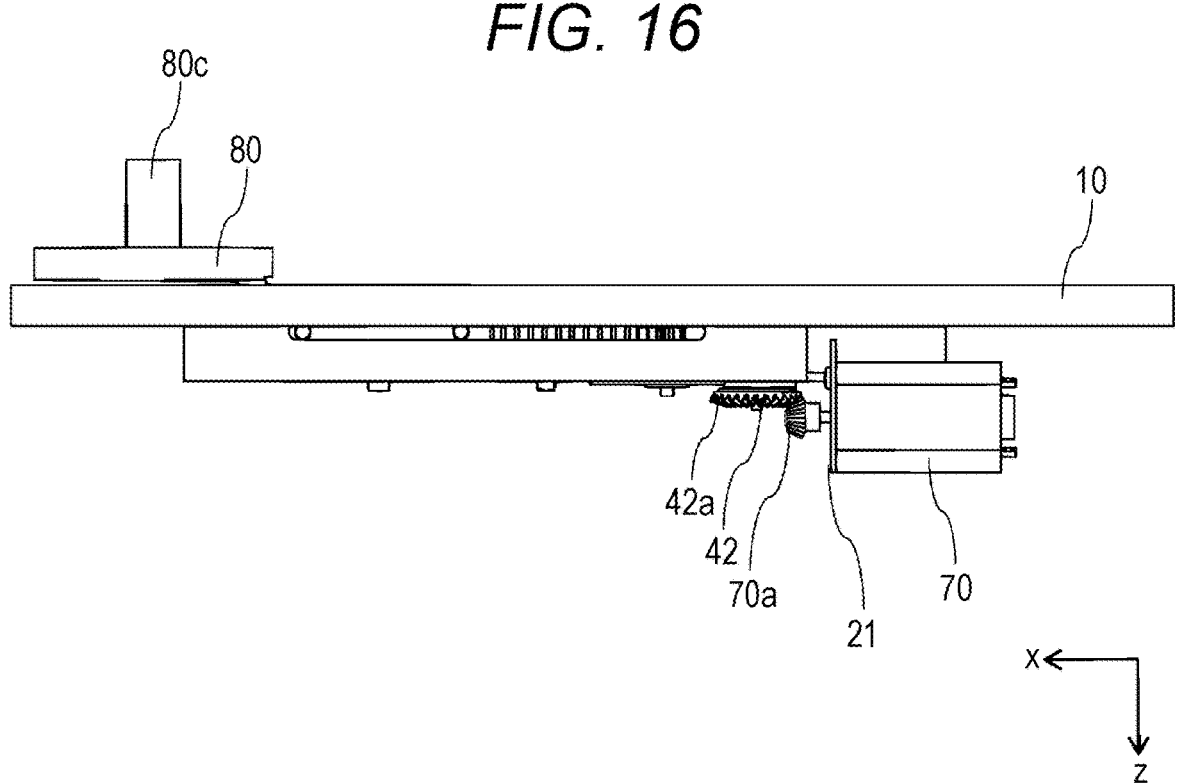
FIG. 16 is a plan view of the movable blade assembly included in the imaging device according to the embodiment viewed from the positive y-direction with the blade closed.
Figure 17:
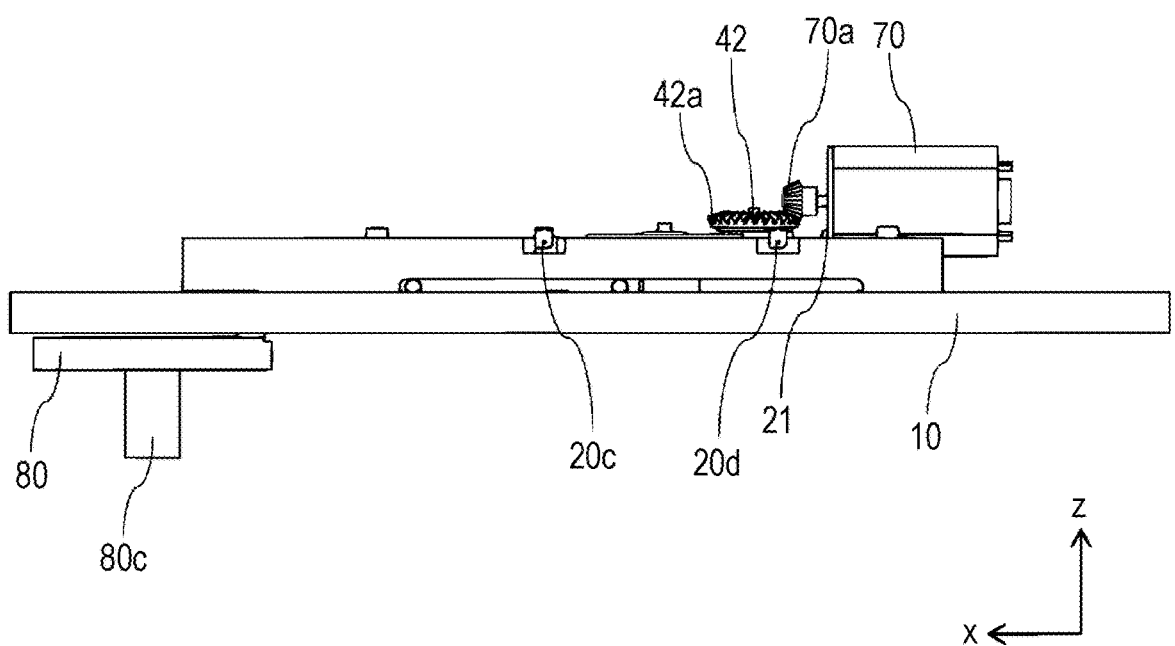
FIG. 17 is a plan view of the movable blade assembly included in the imaging device according to the embodiment viewed from the negative y-direction with the blade closed.
Figure 18:
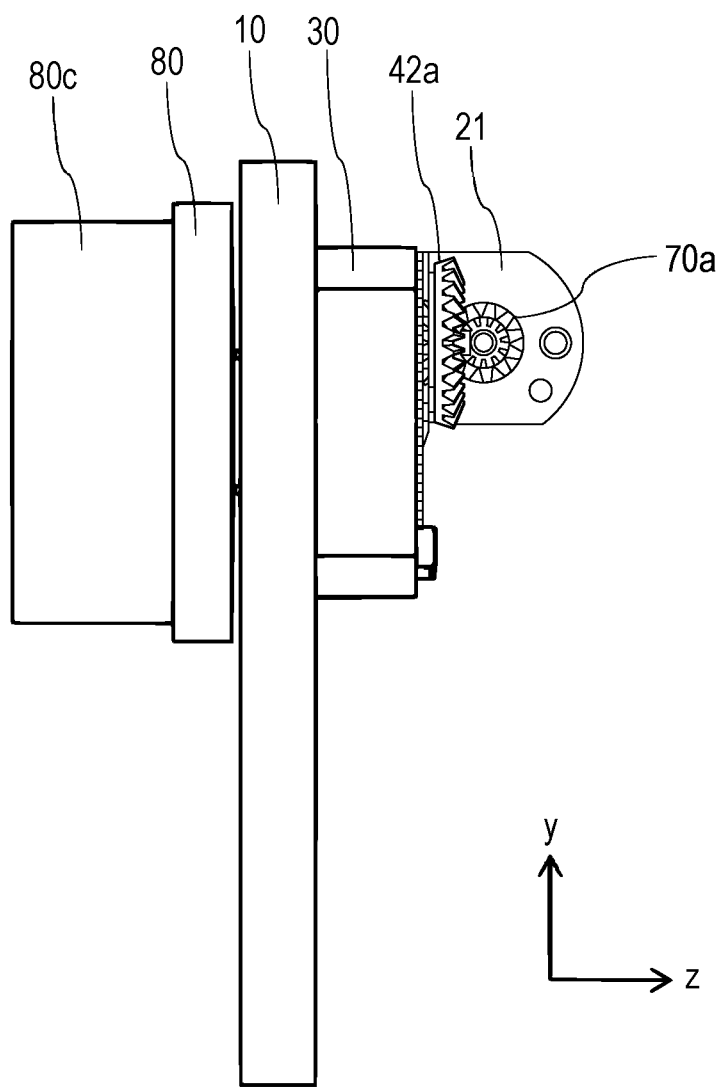
FIG. 18 is a plan view of the movable blade assembly included in the imaging device according to the embodiment viewed from the positive x-direction with the blade closed.
Figure 19:
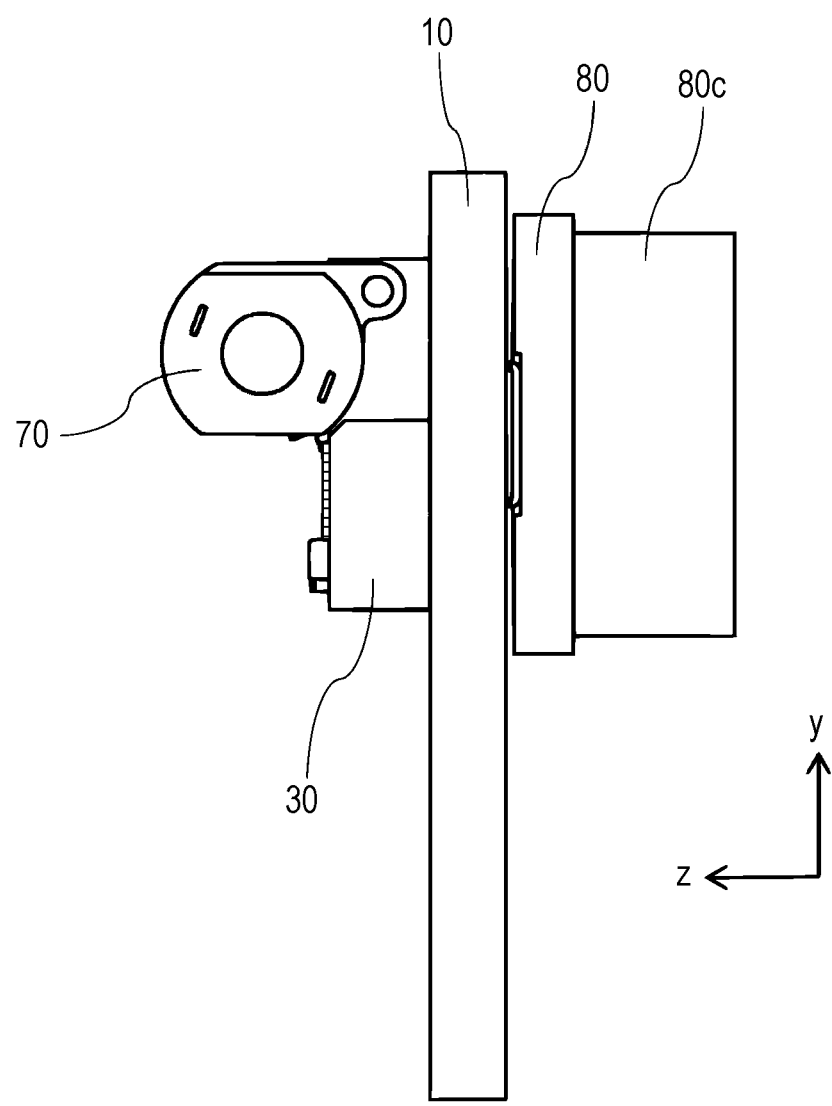
FIG. 19 is a plan view of the movable blade assembly included in the imaging device according to the embodiment viewed from the negative x-direction with the blade closed.
Figure 20:
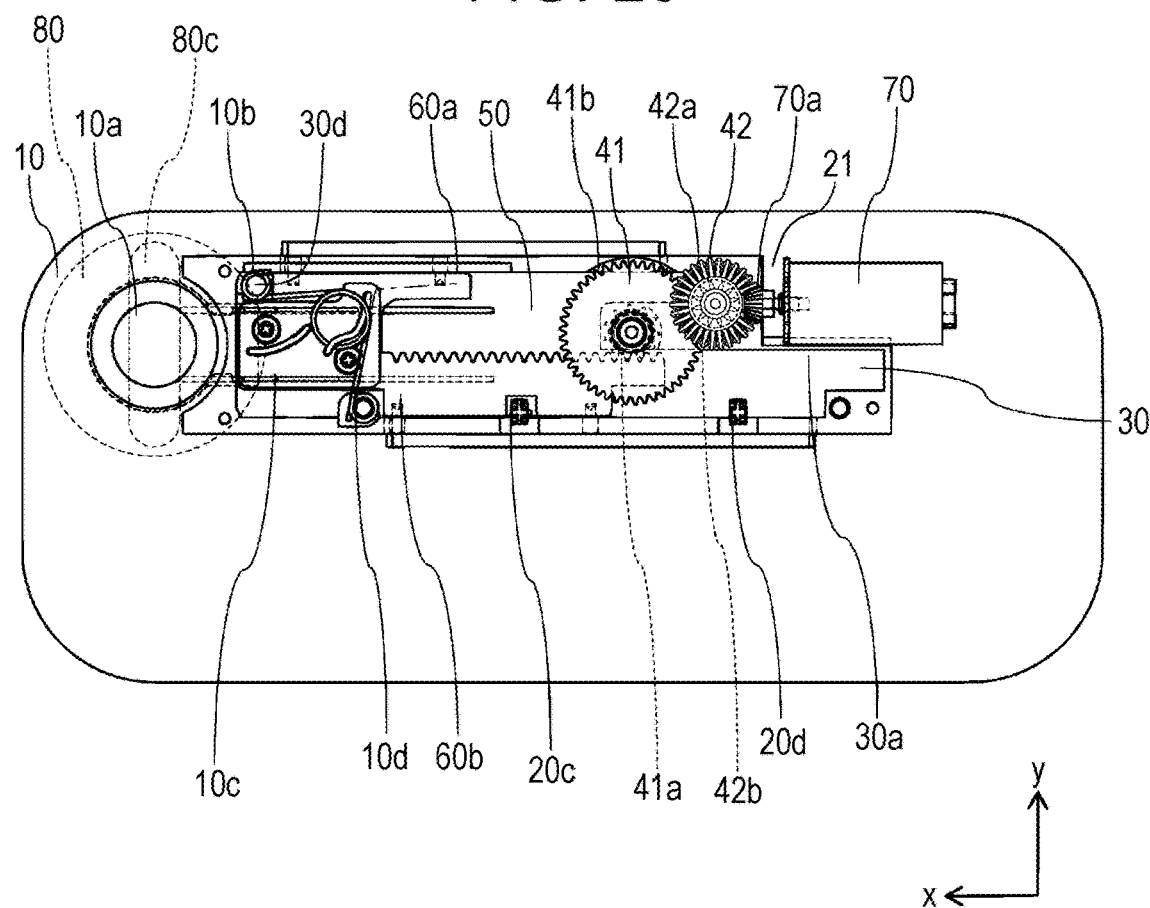
FIG. 20 is a transparent plan view of the movable blade assembly included in the imaging device according to the embodiment viewed from the positive z-direction with the blade closed.
Figure 21:
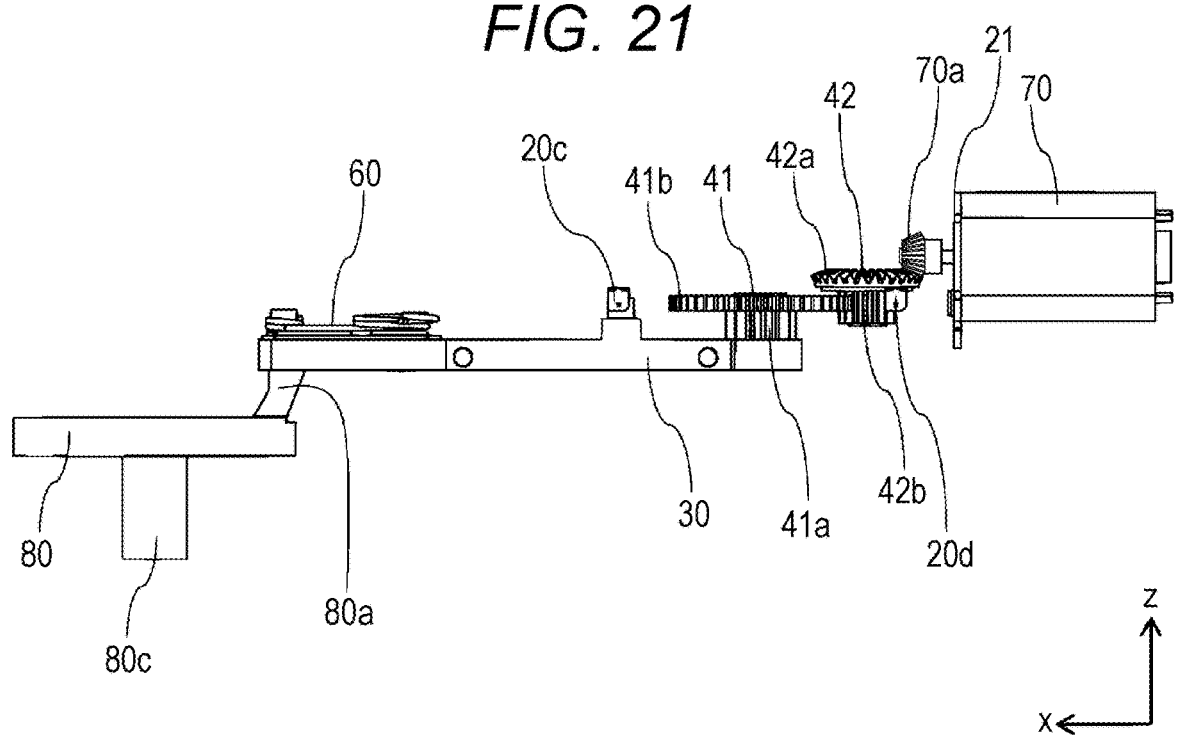
FIG. 21 is a plan view of the drive assembly included in the imaging device according to the embodiment viewed from the positive y-direction with the blade closed.

FIG. 14 is a plan view of the movable blade assembly viewed from the positive z-direction. FIG. 15 is a plan view of the movable blade assembly viewed from the negative z-direction. FIG. 16 is a plan view of the movable blade assembly viewed from the positive y-direction. FIG. 17 is a plan view of the movable blade assembly viewed from the negative y-direction. FIG. 18 is a plan view of the movable blade assembly viewed from the positive x-direction. FIG. 19 is a plan view of the movable blade assembly viewed from the negative x-direction. FIG. 20 is a plan view of the movable blade assembly viewed from the positive z-direction. FIG. 21 is a plan view of the drive assembly in the movable blade assembly viewed from the positive y-direction.

Overall Structure of Movable Blade Assembly

The movable blade assembly included in the imaging device according to the present embodiment includes a base 10, a cover 20, a slide gear 30, a first gear 41, a second gear 42, a pressing member 50, a spring 60, a motor 70, and a blade 80.

Base 10

The base 10 serves as a cover (housing) for the movable blade assembly and the entire imaging device on the subject end. The base 10 in the present embodiment is a plate member, but may be a box member as a cover (housing) for the imaging device. The base 10 has an opening 10a, which is a circular through-hole formed through the base 10 in z-direction. In the negative x-direction from the opening 10a, guide slots 10b and 10c are formed through the base 10 in z-direction and extend linearly in the negative x-direction. The guide slots 10b and 10c receive arms 80a and 80b of the blade 80.

As shown at least in FIG. 2, the base 10 has shafts 10d, 10e, and 10f on its surface in the positive z-direction. The shafts 10d, 10e, and 10f protrude in the positive z-direction. A second arm 60b of the spring 60 is held on the shaft 10d. The shaft 10e receives the first gear 41. The shaft 10f receives the second gear 42. The base 10 has cutouts 10g and 10h receiving position sensors 20c and 20d.

Cover 20

The cover 20 is attached to the base 10 from a position in the positive z-direction to face the base 10. The base 10 and the cover 20 together define a space accommodating the slide gear 30, the first gear 41, the second gear 42, the pressing member 50, and the spring 60. The cover 20 has holes 20a and 20b to receive the shafts 10e and 10f.

The cover 20 receives the position sensors 20c and 20d. The position sensors 20c and 20d are used with a light shield 31 to detect the position of the light shield 31 either nearer the position sensor 20c or nearer the position sensor 20d. The position sensors 20c and 20d are, for example, photointerrupters. More specifically, the position sensors 20c and 20d include a light emitter and a light receiver. The light shield 31 between the emitter and the receiver blocks light to allow detection of the position of the light shield 31. The light shield 31 is connected to the slide gear 30 connected to the blade 80. This allows the position sensors 20c and 20d and the light shield 31 to detect an open state or a closed state of the blade 80. As described later, the position sensors 20c and 20d and the light shield 31 together function as a position detector 121.

The position sensors 20c and 20d and the light shield 31 are not limited to photointerrupters, and may be photoreflectors or position detectors using Hall devices that detect a position with a magnetic force. When such another sensor is used, the light shield 31 is replaced with a reflector or a magnet depending on the used sensor.

Slide Gear 30

The slide gear 30 is connected to the blade 80 to reciprocate in x-direction relative to the base 10. The slide gear 30 includes a rack gear 30a extending in x-direction. The rack gear 30a meshes with a small gear 41a in the first gear 41. As the first gear 41 rotates, the slide gear 30 moves in x-direction through the rack gear 30a.

The slide gear 30 includes guide slots 30b and 30c formed through the slide gear 30 in z-direction and extending in x-direction. The guide slots 30b and 30c receive the arms 80a and 80b of the blade 80. The slide gear 30 includes a shaft 30d extending in the positive z-direction. A first arm 60a of the spring 60 is held on the shaft 30d. The slide gear 30 has screw holes 30e and 30f, which receive screws 51a and 51b to fasten the pressing member 50 to the slide gear 30.

The light shield 31 is connected to the slide gear 30. As described above, the light shield 31 is used with the position sensors 20c and 20d connected to the cover 20 to detect the position of the blade 80, thus allowing determination as to whether the blade 80 is in the open state or in the closed state.

First Gear 41

The first gear 41 includes the small gear 41a and a large gear 41b having a larger diameter than the small gear 41a. The small gear 41a is coaxial with the large gear 41b, and rotates in coordination with the large gear 41b. The small gear 41a meshes with the rack gear 30a in the slide gear 30. The large gear 41b meshes with a small gear 42b in the second gear 42.

Second Gear 42

The second gear 42 includes the small gear 42b and a large gear 42a having a larger diameter than the small gear 42b. The small gear 42b is coaxial with the large gear 42a, and rotates in coordination with the large gear 42a. As described above, the small gear 42b meshes with the large gear 41b in the first gear 41. The large gear 42a meshes with an output gear 70a included in the motor 70.

Motor 70

The motor 70 rotates with power provided from a blade driver 106 (described later). The motor 70 includes an output shaft protruding in the positive x-direction and the output gear 70a at the tip of the output shaft. The output shaft of the motor 70 is placed through a through-hole in a washer 21 and a through-hole 20e in the cover 20. As described above, the output gear 70a meshes with the large gear 42a in the second gear 42.

Pressing Member 50

The pressing member 50 is located between the slide gear 30 and the spring 60. The pressing member 50 is connected to the slide gear 30 with the screws 51a and 51b placed through screw holes 50a and 50b, which are through-holes.

Spring 60

The spring 60 is a torsion spring having the first arm 60a and the second arm 60b. The spring 60 applies an urging force in the rotation direction. The first arm 60a of the spring 60 is held on the shaft 30d in the slide gear 30. The second arm 60b of the spring 60 is held on the shaft 10d in the base 10. The spring 60 can thus apply an urging force to the slide gear 30 relative to the base 10. When the blade 80 is in the closed state, the spring 60 applies an urging force to the slide gear 30 in the positive x-direction. When the blade 80 is in the open state, the spring 60 applies an urging force to the slide gear 30 in the negative x-direction. In other words, the spring 60 applies an urging force to the slide gear 30 in the direction to maintain the open state when the blade 80 is in the open state and in the direction to maintain the closed state when the blade 80 is in the closed state. The spring 60 is located to change its urging direction in the middle of an area in which the blade 80 is movable. The spring 60 is an example of an urging member in an aspect of the present invention. The spring 60 may be replaced with a spring other than a torsion spring or another urging member.

Blade 80

The blade 80 is supported by the base 10 to reciprocate in x-direction along the guide slots 10b, 10c, 30b, and 30c to cover or uncover the opening 10a. The blade 80 includes a shade. In the closed state to cover the opening 10a, the blade 80 blocks light incident on an image sensor 111. In the open state to uncover the opening 10a, the blade 80 allows light from the subject end to be incident on the image sensor 111.

The imaging device according to the present embodiment may include a shutter (not shown) separately from the blade 80 as a shade. In this case, when the blade 80 is in the open state, the shutter operates to control the light exposure of (light incident on) the image sensor 111.

The blade 80 has, on its surface in the negative z-direction (on the subject end), a knob 80c protruding in the negative z-direction, which is operable by a user. The user operates the knob 80c to move the blade 80 against the force to maintain the position of the blade 80. The knob 80c is an example of an operation unit in an aspect of the present invention.

In place of the knob 80c, the blade 80 may have a recess or a protrusion easily operable by the user on the surface in the negative z-direction. The recess or protrusion is another example of the operation unit in an aspect of the invention.

The blade 80 may be a filter that partially blocks light to provide an intended effect, rather than a shade. The blade 80 may have a grid structure to partially block light.

(2) Functional Structure of Imaging Device According to Embodiment

Figure 22:
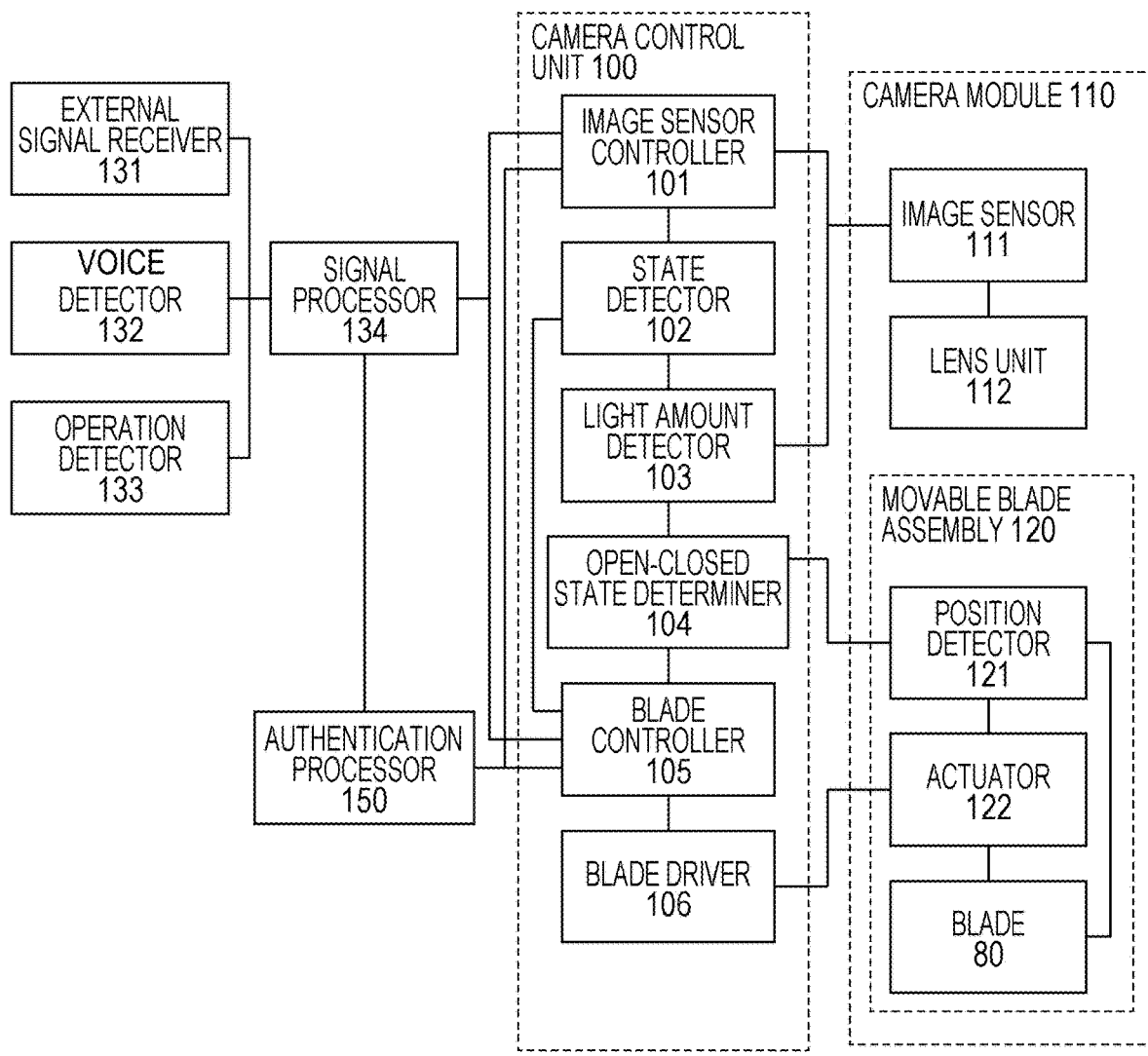
FIG. 22 is a functional block diagram of the imaging device according to the embodiment.

The functional structure of the imaging device will now be described. The operation of each component may be more specifically described with reference to the flowchart described later. FIG. 22 is a functional block diagram of the imaging device according to the present embodiment. As shown in FIG. 22, the imaging device according to the present embodiment includes a camera control unit 100, a camera module 110, a movable blade assembly 120, an external signal receiver 131, a voice detector 132, an operation detector 133, and a signal processor 134.

Camera Control Unit 100

The camera control unit 100 includes an image sensor controller 101, a state detector 102, a light amount detector 103, an open-closed state determiner 104, a blade controller 105, and a blade driver 106.

Image Sensor Controller 101

The image sensor controller 101 controls the operation of the image sensor 111 to capture images. The image sensor controller 101 switches on or off the image sensor 111.

State Detector 102

The state detector 102 detects the state of the imaging device. In the present embodiment, the state detector 102 particularly detects the on or off state of the imaging device.

Light Amount Detector 103

The light amount detector 103 detects the amount of light (degree of light brightness) incident on the image sensor 111.

Open-closed State Determiner 104

The open-closed state determiner 104 determines whether the blade 80 in the movable blade assembly 120 is in the open state or in the closed state based on the result of position detection performed by the position detector 121 included in the movable blade assembly 120 or the amount of light detected by the light amount detector 103.

Blade Controller 105

The blade controller 105 drives the blade driver 106 based on input from the signal processor 134 and the state detector 102, and controls the operation of the movable blade assembly 120.

In a non-imaging mode in which imaging is not performed and in the locked state with no success in authentication, the blade controller 105 may constantly apply a force to the slide gear 30 in the positive x-direction to maintain the blade 80 in the closed state.

Blade Driver 106

The blade driver 106 drives the movable blade assembly 120 by providing a predetermined voltage and a predetermined current to an actuator 122 as controlled by the blade controller 105.

Camera Module 110

The camera module 110 includes the image sensor 111 and a lens unit 112.

Image Sensor 111

The image sensor 111 is a photoelectric converter that converts incident light to electric signals. The image sensor 111 is, for example, a complementary metal-oxide semiconductor (CMOS) sensor or a charge-coupled device (CCD), but is not limited to such devices. The image sensor 111 receives light from the subject end through the lens unit 112, converts the light to electric signals, and outputs the signals.

Lens Unit 112

The lens unit 112 transmits light from the subject end while refracting the light to gather onto the image sensor 111. The lens unit 112 includes one or more lenses, and may also include an optical member other than a lens, such as a filter.

Movable Blade Assembly 120

The movable blade assembly 120 includes the position detector 121, the actuator 122, and the blade 80. The blade 80 has the structure and the function described above.

Actuator 122

The actuator 122 includes the motor 70, the first gear 41, the second gear 42, and the slide gear 30. The actuator 122 moves the blade 80 in x-direction using electric power from an external source to cover and uncover the opening 10a.

Position Detector 121

The position detector 121 includes the position sensors 20c and 20d and the light shield 31. As described above, the position detector 121 includes, for example, optical sensors, such as photointerrupters. The position detector 121 detects the position of the blade 80 to detect the open or closed state of the blade 80.

External Signal Receiver 131

The external signal receiver 131 receives external signals through wired or wireless communication, and outputs the signals to the signal processor 134.

Voice Detector 132

The voice detector 132 detects a voice, such as a voice of the user, to enable a process corresponding to the detected voice.

Operation Detector 133

The operation detector 133 detects operational information input into the imaging device from, for example, the user. More specifically, the operation detector 133 detects signals input through, for example, a keyboard, a mouse, a touchscreen, and a voice. The operation detector 133 may detect a user input performed in a manner other than the above manners.

Signal Processor 134

The signal processor 134 controls predetermined components included in the imaging device to perform predetermined operations based on, for example, the detection results obtained from the external signal receiver 131, the voice detector 132, and the operation detector 133.

Authentication Processor 150

The authentication processor 150 authenticates a registered, authorized user based on an image of, for example, the user's fingerprint, face, iris, or vein captured with the image sensor 111 in an authentication process. In response to a success in the authentication, the imaging device enters the unlocked state and performs a predetermined process. Before a success in the authentication or in response to a failure in the authentication, the imaging device enters the locked state and performs a predetermined process. The authentication is performed with, for example, a known image recognition technique such as pattern matching. After a success or a failure in the authentication performed by the authentication processor 150, the signal processor 134 or the blade controller 105 performs a predetermined operation.

(3) Operation of Imaging Device According to Embodiment

Figure 23:
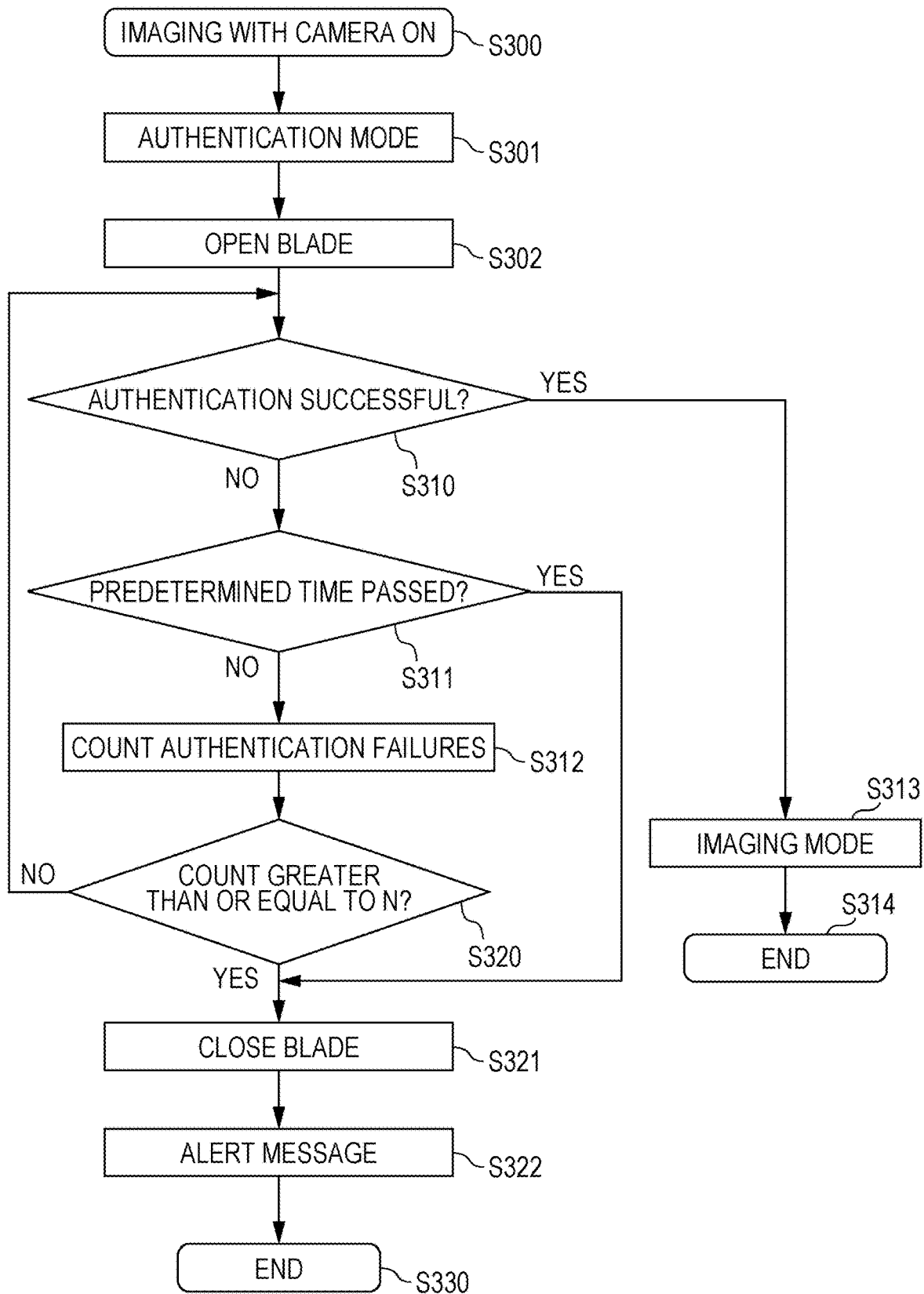
FIG. 23 is a flowchart showing the operation of the imaging device according to the embodiment.

The authentication process performed in the imaging device according to the present embodiment will now be described with reference to the flowchart in FIG. 23. The authentication process in the present embodiment temporarily enables image capturing to obtain an image for authentication. This process will be described. The other processes such as image capturing are performed in known manners.

S300

Upon detecting a predetermined user operation, the signal processor 134 first enables image capturing with the imaging device for the authentication process (S300). The user operation that starts the authentication process is, for example, a voice of the user stating, for example, "Start the authentication process," which is detected by the voice detector 132. In another example, the process is started in response to a user operation to start the authentication process on a touchscreen detected by the operation detector 133. The operation detector 133 and the voice detector 132 in the present embodiment each are an example of an operation detector in an aspect of the present invention.

S301 to S302

The signal processor 134 then sets an operation mode to an authentication mode (S301). The signal processor 134 activates the actuator 122 with the blade controller 105 and the blade driver 106 to place the blade 80 in the open state.

S310

The image sensor controller 101 then activates the image sensor 111 to capture an image for authentication. This image is, for example, a face image of the user. The authentication processor 150 then performs the authentication process by, for example, pattern matching based on the captured image and an image for authentication prepared in advance (S310).

S313 to S314

In response to a success in the authentication (YES in S310), the signal processor 134 allows the imaging device to enter the unlocked state in which image capturing is enabled, sets the operation mode to an imaging mode (S313), and ends the process (S314).

S311

In response to a failure in the authentication (NO in S310), the signal processor 134 determines whether a predetermined time has passed before the authentication is complete (S311). In response to the predetermined time passing before the authentication is complete (YES in S311), the processing advances to S321.

S312

In response to the predetermined time not passing (NO in S311) after the failure in the authentication (NO in S310), the signal processor 134 counts the number of authentication failures (S312). The count is reset at the start of the process of the flowchart.

S320

In response to the count of authentication failures being less than a natural number N (NO in S320), the processing returns to S310 to repeat the authentication process. In response to the count of authentication failures being greater than or equal to the natural number N (YES in S320), the processing advances to S321.

S321 to S322 and S322 to S330

In response to the predetermined time passing and no success in the authentication (YES in S311) or in response to N or more authentication failures (YES in S320), the blade controller 105 drives the actuator 122 with the blade driver 106 to place the blade 80 in the closed state (S321). An alert message indicating unsuccessful authentication is then provided to the user (S322). The authentication process ends (S330). The alert message to the user is, for example, a voice message or an image output indicating that the authentication has failed.

(4) First Modification

Figure 24:
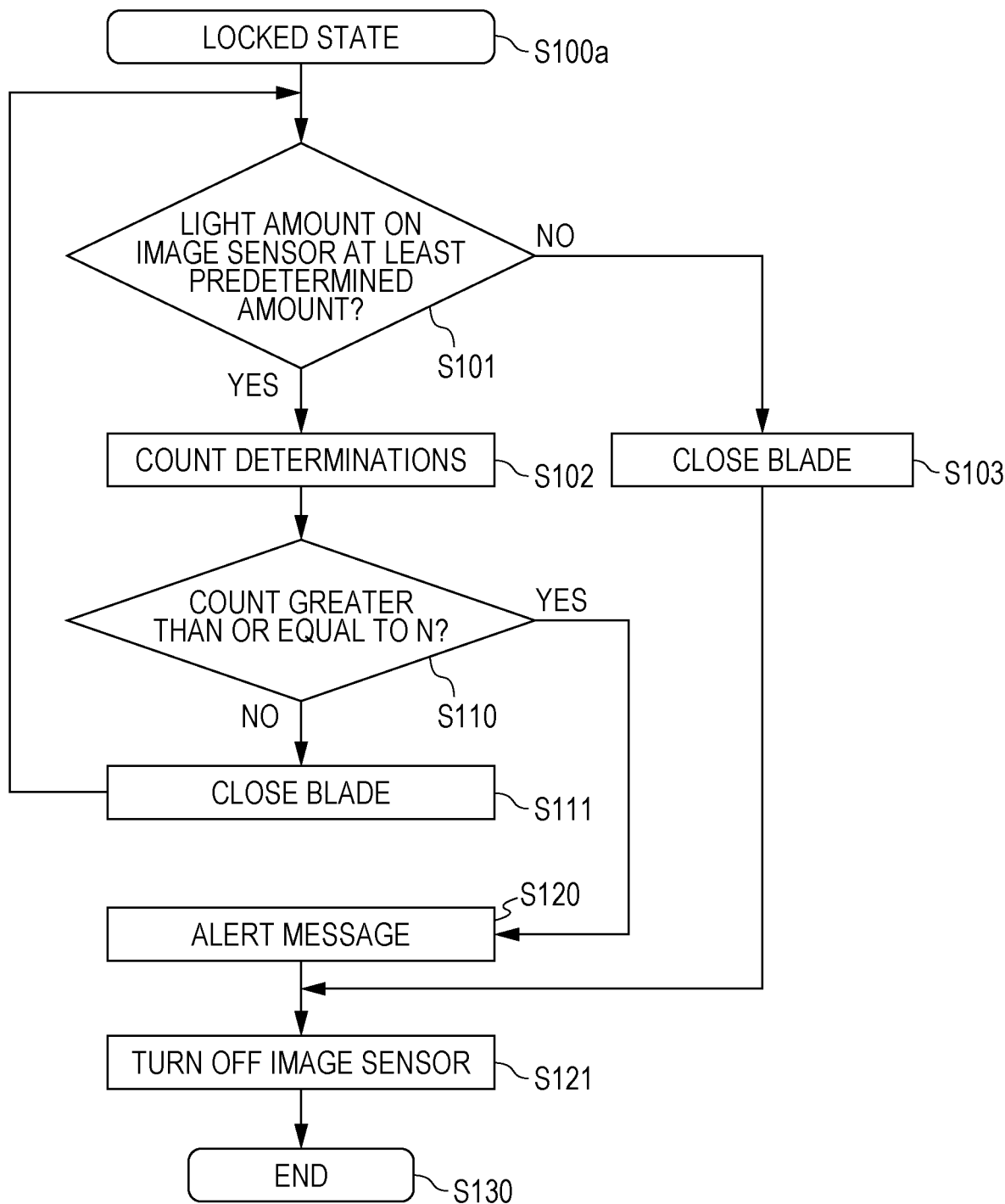
FIG. 24 is a flowchart showing the operation of an imaging device according to a first modification of the embodiment.

The opening-closing operation of the blade in an imaging device according to a modification of the present embodiment will now be described with reference to the flowchart in FIG. 24.

S100a

The opening-closing operation of the blade 80 according to the present modification is performed in the locked state with no success in authentication (S100a). This process will be described. The other processes such as image capturing are performed in known manners.

S101

The open-closed state determiner 104 first determines whether the amount of light incident on the image sensor 111 is at least a predetermined amount (S101). The amount of light is detected by the light amount detector 103. The determination as to whether the amount of light is at least the predetermined amount is performed by determining whether the detected amount of light is greater than a predetermined threshold. In other words, the open-closed state determiner 104 determines, with the image sensor 111, whether the detected amount of light is the amount for the open state of the blade 80 or the amount for the closed state of the blade 80. In response to the processing in S101 performed first, the image sensor 111 is powered on. In another embodiment, the image sensor 111 may be powered on at the start of the process in S100a.

S102

Upon determining that the amount of light is at least the predetermined amount (YES in S101), the open-closed state determiner 104 counts the number of times the amount of light is determined to be at least the predetermined amount (S102).

NO in S110, to S111

In response to the count for the amount of light determined to be at least the predetermined amount being less than a natural number N (NO in S110), the blade controller 105 drives the actuator 122 with the blade driver 106 to place the blade 80 in the closed state (S111). The count is reset at the start of the process of the flowchart.

YES in S110, to S120

In response to the count for the amount of light determined to be at least the predetermined amount being greater than or equal to the natural number N (YES in S110), indicating that the blade 80 is not in the closed state after repeatedly controlled to be in the closed state, an alert message is provided to the user (S120). For example, the imaging device may output, to the user, a voice message or an image indicating that the blade 80 cannot be closed. The process then advances to S121.

NO in S101, to S103

In response to the open-closed state determiner 104 determining that the amount of light is less than the predetermined amount (NO in S101), the blade controller 105 drives the actuator 122 with the blade driver 106 to place the blade 80 in the closed state (S103). This includes the processing for the open-closed state determiner 104 erroneously detecting a closed state in dark surroundings although the blade 80 is in the open state.

S121 to S130

After the processing in S103 or S120, the image sensor controller 101 stops the operation of the image sensor 111 (S121) and ends the process (S130). For the image sensor 111 that has already stopped the operation, no particular processing is performed in this step.

The above process is performed in the locked state at predetermined time intervals, at activation of the imaging device, at activation of the electronic device including the imaging device, or at detection of vibration with an acceleration sensor or an angular velocity sensor.

(5) Second Modification

Figure 25:
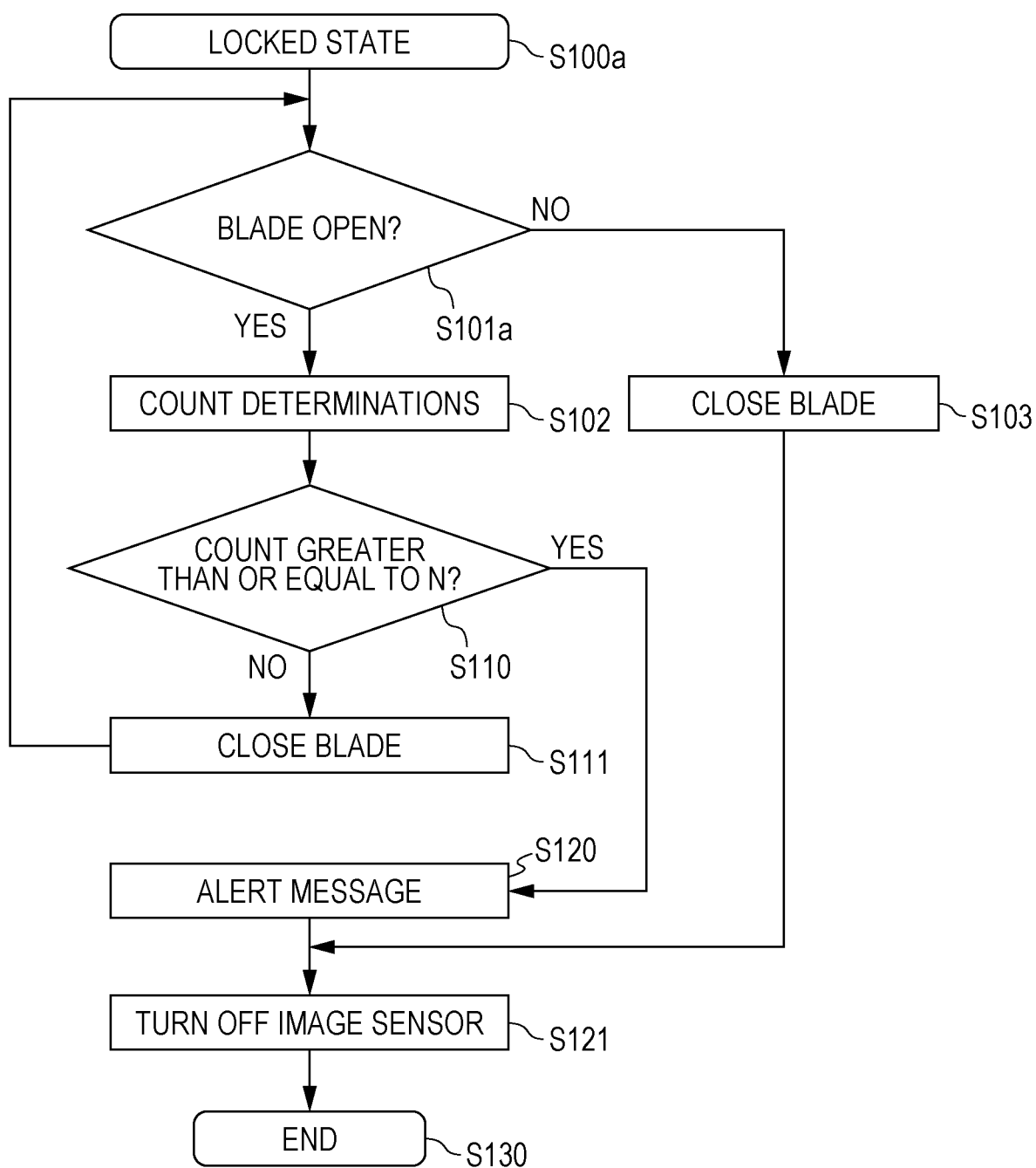
FIG. 25 is a flowchart showing the operation of an imaging device according to a second modification of the embodiment.

A second modification of the present embodiment will now be described with reference to the flowchart in FIG. 25. The present modification differs from the first modification in one or more steps performed in the locked state. The other structures and processing are the same as in the first modification. The modification will be described focusing on its differences from the first modification, without the same structures and processing being described.

S101a

In the present modification, the open-closed state determiner 104 determines whether the blade 80 is in the open state or in the closed state with the position detector 121 included in the movable blade assembly 120, instead of with the light amount detector 103. In response to the blade 80 being determined to be in the open state, the processing in S102 and subsequent steps are performed. In response to the blade 80 being in the closed state, the processing in S103 and subsequent steps are performed.

(6) Third Modification

Figure 26:
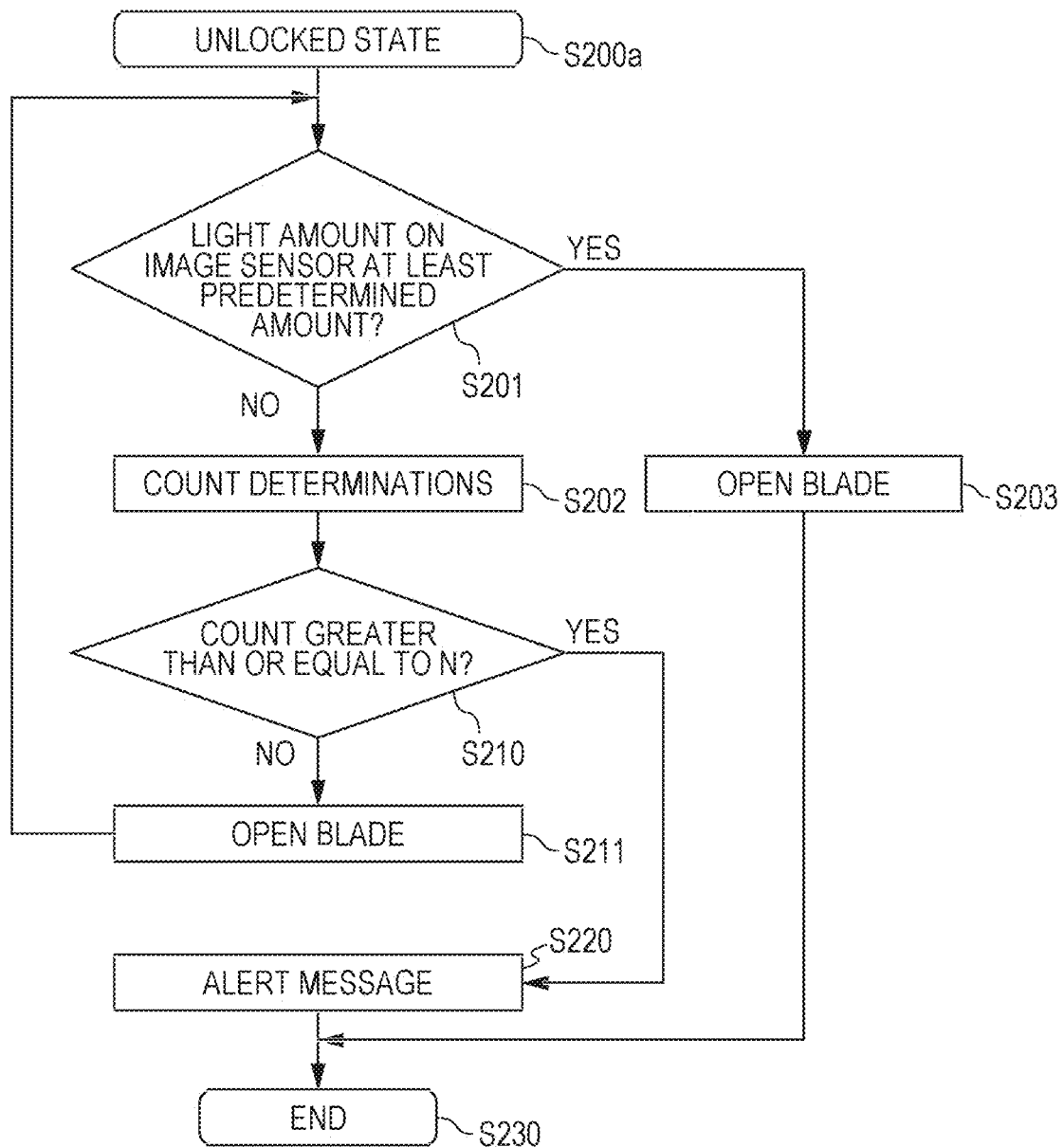
FIG. 26 is a flowchart showing the operation of an imaging device according to a third modification of the embodiment.

A third modification of the present embodiment will now be described with reference to the flowchart in FIG. 26. The present modification is directed to a process performed in the unlocked state with a success in authentication (S200a). This process will be described. The other processes such as image capturing are performed in known manners.

S200a

The opening-closing operation of the blade 80 in the present modification is performed in the unlocked state with a success in authentication (S200a), instead of in the locked state as in the first modification of the embodiment. More specifically, the process is performed in response to a success in the authentication performed by the authentication processor 150.

S201

The open-closed state determiner 104 first determines whether the amount of light incident on the image sensor 111 is at least a predetermined amount (S201). The amount of light is detected by the light amount detector 103. The determination as to whether the amount of light is at least the predetermined amount is performed by determining whether the detected amount of light is greater than a predetermined threshold. In other words, the open-closed state determiner 104 determines, with the image sensor 111, whether the detected amount of light is the amount for the open state of the blade 80 or the amount for the closed state of the blade 80.

S202

In response to the open-closed state determiner 104 determining that the amount of light is less than the predetermined amount (NO in S201), the open-closed state determiner 104 counts the number of times the amount of light is determined to be less than the predetermined amount (S202). The count is reset at the start of the process of the flowchart.

NO in S210, to S211

In response to the count for the amount of light determined to be less than the predetermined amount being less than a natural number N (NO in S210), the blade controller 105 drives the actuator 122 with the blade driver 106 to place the blade 80 in the open state (S211).

YES in S210, to S220

In response to the count for the amount of light determined to be less than the predetermined amount being greater than or equal to the natural number N (YES in S210), indicating that the blade 80 is not in the open state after repeatedly controlled to be in the open state, an alert message is provided to the user (S220). For example, the imaging device may output, to the user, a voice message or an image indicating that the blade 80 cannot be open.

NO in S201, to S203

In response to the open-closed state determiner 104 determining that the amount of light is at least the predetermined amount (YES in S201), the blade controller 105 drives the actuator 122 with the blade driver 106 to place the blade 80 in the open state (S203). This includes the processing for the open-closed state determiner 104 erroneously detecting an open state in bright surroundings although the blade 80 is in the closed state.

S230

After the processing in S203 or S220, the opening-closing process of the blade ends (S230). For the image sensor 111 that has already stopped the operation, no particular processing is performed in this step.

The above process is performed in the unlocked state at predetermined time intervals, at activation of the imaging device, at activation of the electronic device including the imaging device, or at detection of vibration with an acceleration sensor or an angular velocity sensor.

(7) Fourth Modification

Figure 27:
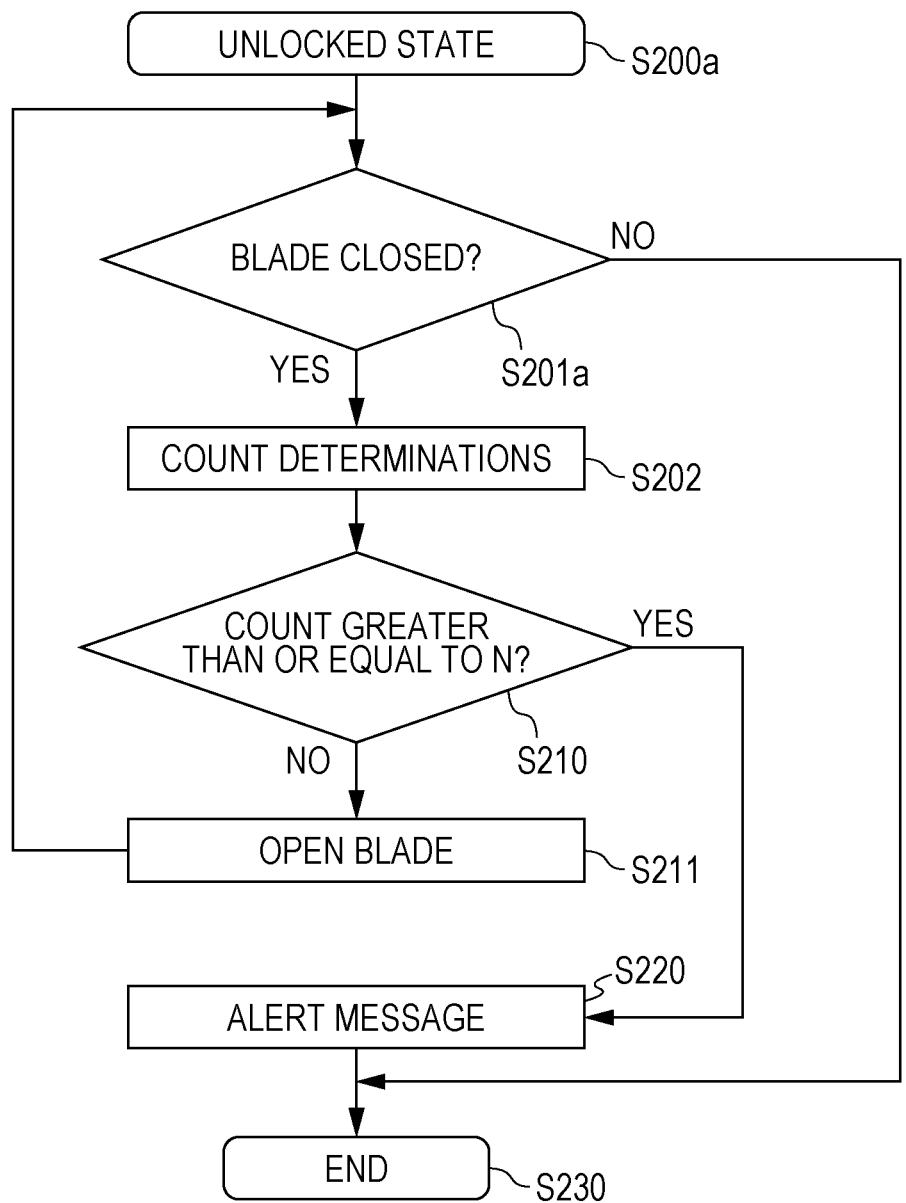
FIG. 27 is a flowchart showing the operation of an imaging device according to a fourth modification of the embodiment.

A fourth modification of the present embodiment will now be described with reference to the flowchart in FIG. 27. The present modification differs from the third modification in one or more steps performed in the unlocked state. The other structures and processing are the same as in the third modification. The modification will be described focusing on its differences from the third modification, without the same structures and processing being described.

S201a

In the present modification, the open-closed state determiner 104 determines whether the blade 80 is in the open state or in the closed state with the position detector 121 included in the movable blade assembly 120, instead of with the light amount detector 103. In response to the blade 80 being in the closed state, the processing in S202 and subsequent steps are performed. In response to the blade 80 being in the open state, the process ends (S230).

2. Features

The structures according to the embodiment of the present invention and the modifications described above have the features described below. The embodiment and the modifications may be partly or entirely combined together.

The imaging device according to one or more embodiments of the present invention places the blade 80 in the open state in response to a predetermined operation for starting authentication performed by the user detected by the operation detector 133 or the voice detector 132. In response to the predetermined time passing in the open state of the blade 80 and no success in authentication performed by the authentication processor 150, the blade 80 is placed in the closed state. This structure allows authentication using the image sensor in the imaging device without any authentication device prepared independently of the imaging device. The blade is automatically placed in the closed state when authentication is unsuccessful. This improves security.

In the imaging device according to one or more embodiments of the present invention, the blade controller 105 controls the blade driver 106 to place the blade 80 in the closed state in response to a failure in authentication performed by the authentication processor 150 in the open state of the blade 80. This structure can immediately place the blade 80 in the closed state in response to an authentication failure. This increases security further.

In the imaging device according to one or more embodiments of the present invention, the blade controller 105 determines whether the blade 80 is in the closed state at predetermined time intervals in the locked state. Upon determining that the blade 80 is in the open state, the blade controller 105 controls the blade driver 106 to place the blade 80 in the closed state. The structure can place the blade 80 that has been in the open state in the locked state back to the closed state after the predetermined time passes. This effectively prevents the blade 80 from remaining open in the locked state.

In the imaging device according to one or more embodiments of the present invention, the blade controller 105 may control the blade driver 106 to maintain the blade 80 in the closed state in the locked state. This structure allows the blade 80 to remain closed under an external force for opening the blade 80 applied in the locked state. This effectively prevents the blade 80 from remaining open as unintended by the user.

In the imaging device according to one or more embodiments of the present invention, the blade controller 105 may determine whether the blade 80 is in the open state or in the closed state based on a result of detection performed by the image sensor 111. This structure allows determination as to whether the blade 80 is in the open state or in the closed state without any extra member for determining the open or closed state of the blade 80. Thus, processes may be performed in accordance with the open or closed state of the blade 80 without additional components for any new structure or additional cost and complicated processing.

The imaging device according to one or more embodiments of the present invention may include the position sensors 20c and 20d and the light shield 31 functioning as the position detector 121. The blade controller 105 may determine whether the blade 80 is in the open state or in the closed state based on a result of detection performed by the position detector 121. This structure allows appropriate determination as to whether the blade 80 is in the open state or in the closed state in dark surroundings.

The imaging device according to one or more embodiments of the present invention includes the base 10 and the spring 60. The opening 10*a* in the base **10* is between the blade 80 and the image sensor 111 in the closed state. The structure allows the spring 60 to maintain the open or closed state of the blade 80, and thus prevents the blade from being open or closed unexpectedly under an external force.

In the imaging device according to one or more embodiments of the present invention, the blade 80 may be movable by the blade driver 106 and by a manual operation of, for example, the knob 80*c*. The structure allows the blade 80 to be moved manually when the blade 80 cannot be closed after, for example, unauthorized access. This can increase security.

In the imaging device according to one or more embodiments of the present invention, the blade 80 may include an operation unit (e.g., knob 80*c*) operable by the user. In this structure, the blade 80 is easily operable manually.

The imaging device according to one or more embodiments of the present invention may be incorporated in an electronic device, such as a smartphone, a tablet, and a personal computer (PC). An electronic device susceptible to privacy invasion and leakage of confidential information caused by unauthorized access may incorporate the imaging device according to one or more embodiments of the present invention to effectively increase security.

3. Supplemental Examples

The embodiments of the present invention have been described specifically. The embodiments described above are mere examples. The scope of the present invention is not limited to the embodiments, but is construed broadly within the scope understandable by those skilled in the art.

For example, the blade 80 reciprocates linearly in x-direction in the embodiments, but the blade 80 may move along an arc.

In the embodiments, the first gear 41, the second gear 42, and the slide gear 30 as power transmission members are located between the motor 70 and the blade 80. The structure may be changed in any manner. In one example, the first gear 41 and the second gear 42 may have different speed reducing ratios. In another example, the first gear 41 and the second gear 42 may be eliminated.

In the embodiments, the motor 70 drives the blade 80 through the first gear 41, the second gear 42, and the slide gear 30. Another component such as an actuator may drive the blade 80 instead of the motor 70.

The direction in which the output shaft of the motor 70 extends and the rotation direction of the power output from the motor 70 may be changed in any other directions.

The base 10 in any embodiment may be a portion of a housing (exterior) that is viewable from outside the imaging device. In this case, the blade may be exposed outside the imaging device.

The functional structures described in the embodiments are mere examples, and may be partly eliminated or may include other structures.

The flowcharts for the authentication process and the opening-closing operation of the blade 80 described in the embodiment and the modifications are mere operational examples. The operations are not limited to the processes described in the flowcharts.

INDUSTRIAL APPLICABILITY

The imaging device according to one or more embodiments of the present invention is used suitably for electronic devices, such as a laptop PC, a smart speaker, a smartphone, and a home security camera.

The invention claimed is:

1. An imaging device, comprising:
   an image sensor;
   a blade operable to switch between a closed state to at least partially block light incident on the image sensor and an open state to allow light to be incident on the image sensor;
   a blade driver configured to drive the blade;
   a blade controller configured to control the blade driver;
   an authentication processor configured to perform authentication of a user based on a result of imaging performed by the image sensor; and
   an operation detector configured to detect an operation,
   wherein the blade controller controls the blade driver to place the blade in the open state in response to a predetermined operation detected by the operation detector and to place the blade in the closed state in response to a predetermined time passing in the open state of the blade and no success in the authentication performed by the authentication processor.

2. The imaging device according to claim 1, wherein the blade controller controls the blade driver to place the blade in the closed state in response to a failure in the authentication performed by the authentication processor in the open state of the blade.

3. The imaging device according to claim 1, wherein the blade controller determines, in a locked state with no success in the authentication performed by the authentication processor, whether the blade is in the closed state at predetermined time intervals and controls the blade driver to place the blade in the closed state in response to the blade being in the open state.

4. The imaging device according to claim 1, wherein the blade controller controls the blade driver to place the blade in the closed state in a locked state with no success in the authentication performed by the authentication processor.

5. The imaging device according to claim 1, wherein the blade controller determines whether the blade is in the open state or in the closed state based on a result of detection performed by the image sensor.

6. The imaging device according to claim 1, further comprising:
   a position detector configured to detect a position of the blade,
   wherein the blade controller determines whether the blade is in the open state or in the closed state based on a result of detection performed by the position detector.

7. The imaging device according to claim 1, further comprising:
   a base having an opening and supporting the blade in a movable manner; and
   an urging member configured to urge the blade in the open state in a direction different from a direction in which the urging member urges the blade in the closed state,
   wherein the opening is between the blade and the image sensor in the closed state of the blade.

8. The imaging device according to claim 7, wherein the blade is movable by the blade driver and by a manual operation.

9. The imaging device according to claim 8, wherein the blade includes an operation unit operable by the user.

10. An electronic device, comprising:
the imaging device according to claim 1.

* * * * *